US011823268B2

(12) United States Patent
Lane et al.

(10) Patent No.: US 11,823,268 B2
(45) Date of Patent: *Nov. 21, 2023

(54) TRADING CIRCLES

(71) Applicant: TRADING TECHNOLOGIES INTERNATIONAL INC., Chicago, IL (US)

(72) Inventors: Richard Lane, Stamford, CT (US); Thomas Jeffrey Weiss, Skokie, IL (US); Thurston Woo, Chicago, IL (US); Jason Shaffer, Chicago, IL (US); Brian J. Buck, Livermore, CA (US); Michael Unetich, Chicago, IL (US); Sagy Pundak Mintz, Tampa, FL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.
This patent is subject to a terminal disclaimer.

(21) Appl. No.: 17/716,614

(22) Filed: Apr. 8, 2022

(65) Prior Publication Data
US 2022/0230248 A1    Jul. 21, 2022

Related U.S. Application Data

(63) Continuation of application No. 15/852,625, filed on Dec. 22, 2017, which is a continuation of application (Continued)

(51) Int. Cl.
*G06Q 40/04* (2012.01)
*G06Q 40/06* (2012.01)

(52) U.S. Cl.
CPC .............. *G06Q 40/04* (2013.01); *G06Q 40/06* (2013.01)

(58) Field of Classification Search
CPC ................................ G06Q 40/04; G06Q 40/06
(Continued)

(56) References Cited

U.S. PATENT DOCUMENTS 5,508,731 A    4/1996  Kohorn
5,845,279 A    12/1998 Garofalakis et al.
(Continued)

FOREIGN PATENT DOCUMENTS

CA        2332235 A1      9/2000
JP        2002-150041 A   5/2002
(Continued)

OTHER PUBLICATIONS

First Office Action for Chinese Application No. 201910388805.0, dated Nov. 30, 2022.
(Continued)

*Primary Examiner* — Clifford B Madamba
(74) *Attorney, Agent, or Firm* — McDonnell Boehnen Hulbert & Berghoff LLP

(57) ABSTRACT

The disclosed embodiments provide trading circles. An example method includes defining a group having a plurality of members, wherein one or more of the plurality of members interacts with an exchange that facilitates market transactions; detecting a first interaction of a first group member with the exchange; and communicating, in response to detecting the first interaction, data related to the first interaction to a second group member before the first group member receives confirmation of the first interaction from the exchange.

16 Claims, 10 Drawing Sheets

Related U.S. Application Data

No. 14/314,427, filed on Jun. 25, 2014, now Pat. No. 10,102,576, which is a continuation of application No. 13/839,369, filed on Mar. 15, 2013, now Pat. No. 8,799,143.

(58) Field of Classification Search
USPC .......................................................... 705/37
See application file for complete search history.

(56) References Cited

U.S. PATENT DOCUMENTS

| | | | |
|---|---|---|---|
| 6,021,397 | A | 2/2000 | Jones et al. |
| 6,026,388 | A | 2/2000 | Liddy et al. |
| 6,253,187 | B1 | 6/2001 | Fox |
| 6,628,629 | B1 | 9/2003 | Jorgensen |
| 7,260,554 | B2 | 8/2007 | Morano et al. |
| 7,315,838 | B2 | 1/2008 | Gershon |
| 7,315,839 | B2 | 1/2008 | McQuain |
| 7,437,325 | B2 | 10/2008 | Kemp, II et al. |
| 7,536,328 | B2 | 5/2009 | Singer et al. |
| 7,536,344 | B2 | 5/2009 | Singer et al. |
| 7,542,941 | B1 | 6/2009 | Cohen |
| 7,571,140 | B2 | 8/2009 | Weichert et al. |
| 7,630,986 | B1 | 12/2009 | Herz et al. |
| 7,778,919 | B2 | 8/2010 | Waelbroeck et al. |
| 7,813,995 | B2 | 10/2010 | Burns et al. |
| 7,996,296 | B2 | 8/2011 | Lange |
| 8,065,177 | B2 | 11/2011 | Puccio et al. |
| 8,214,280 | B2 | 7/2012 | Singer et al. |
| 8,239,222 | B2 | 8/2012 | Meggs |
| 8,315,940 | B2 | 11/2012 | Winbom et al. |
| 8,645,203 | B2 | 2/2014 | Bocheck |
| 8,799,143 | B1 | 8/2014 | Lane et al. |
| 10,078,869 | B2 | 9/2018 | Singer et al. |
| 10,102,576 | B2 | 10/2018 | Lane et al. |
| 10,672,074 | B2 | 6/2020 | Singer et al. |
| 2001/0037275 | A1 | 11/2001 | Johnson et al. |
| 2001/0042785 | A1 | 11/2001 | Walker et al. |
| 2002/0052827 | A1* | 5/2002 | Waelbroeck ........... G06Q 40/06 705/26.1 |
| 2002/0147670 | A1 | 10/2002 | Lange |
| 2003/0055775 | A1 | 3/2003 | McQuain |
| 2003/0078865 | A1 | 4/2003 | Lee |
| 2003/0208430 | A1 | 11/2003 | Gershon |
| 2003/0236737 | A1 | 12/2003 | Kemp, II et al. |
| 2004/0117302 | A1 | 6/2004 | Weichert et al. |
| 2004/0249740 | A1 | 12/2004 | Romani |
| 2005/0144112 | A1 | 6/2005 | Singer et al. |
| 2005/0177472 | A1 | 8/2005 | Larsen et al. |
| 2007/0100735 | A1 | 5/2007 | Kemp, II et al. |
| 2007/0100736 | A1 | 5/2007 | Singer et al. |
| 2007/0282728 | A1 | 12/2007 | Carpenter et al. |
| 2007/0282729 | A1* | 12/2007 | Carpenter ............. G06Q 40/06 705/36 R |
| 2009/0030711 | A1 | 1/2009 | Puccio et al. |
| 2009/0055325 | A1 | 2/2009 | Leventhal et al. |
| 2009/0192933 | A1 | 7/2009 | Singer et al. |
| 2010/0205096 | A1 | 8/2010 | Meggs |
| 2010/0241591 | A1 | 9/2010 | Fishbain |
| 2010/0245191 | A1 | 9/2010 | Castaneda et al. |
| 2011/0302055 | A1 | 12/2011 | Drake |
| 2012/0016785 | A1 | 1/2012 | Mintz |
| 2012/0016786 | A1 | 1/2012 | Mintz et al. |
| 2012/0030087 | A1 | 2/2012 | Marynowski et al. |
| 2012/0239546 | A1 | 9/2012 | Singer et al. |
| 2012/0271745 | A1 | 10/2012 | Buck |
| 2012/0310808 | A1 | 12/2012 | Madle et al. |
| 2014/0143156 | A1 | 5/2014 | Darago et al. |
| 2015/0019399 | A1 | 1/2015 | Lane et al. |
| 2016/0350835 | A1 | 12/2016 | Rittman et al. |
| 2018/0122010 | A1 | 5/2018 | Lane et al. |
| 2018/0357718 | A1 | 12/2018 | Singer et al. |
| 2020/0250754 | A1 | 8/2020 | Singer et al. |

FOREIGN PATENT DOCUMENTS

| | | |
|---|---|---|
| JP | 2003-531444 A | 10/2003 |
| JP | 2006-012189 A | 1/2006 |
| JP | 2010-134753 A | 6/2010 |
| JP | 2011-107897 A | 6/2011 |
| KR | 1020020062526 A | 7/2002 |
| WO | 1996/05563 A1 | 2/1996 |
| WO | 2001/080130 A1 | 10/2001 |
| WO | 2011/056399 A1 | 5/2011 |

OTHER PUBLICATIONS

First Office Action for Chinese Application No. 201910389134.X, dated Dec. 1, 2022.

Bainbridge, Alex: Hotel Booking Process—Design & Usability Report, Feb. 2003, Travel UCD, pp. 1-51.

Dan, et al.: "Connecting Client Objectives with Resource Capabilities: An Essential Component for Grid Service Management Infrastructures," Nov. 2004, pp. 1-9.

Dempster, et al.: "A real-time adaptive trading system using genetic programming", 2001, Quantitative Finance, vol. 1, pp. 397-341.

Extended European Search Report for European Application No. 13877713.1 dated Sep. 22, 2016 (mailed Oct. 4, 2016).

International Search Report and Written Opinion of International Application No. PCT/US2004/043582 dated Feb. 8, 2007 (mailed Feb. 28, 2007).

International Search Report and Written Opinion for International Application No. PCT/US2013/035654 dated Jun. 24, 2013 (mailed Jul. 3, 2013).

Kemp II, Unpublished U.S. Appl. No. 10/376,932, filed Feb. 28, 2003.

Krebsbach, K., "Trading" Orc's Liquidator Floods the Street [online], *Bank Technology News*, New York: Dec. 2003, vol. 16, Iss. 12, p. 1. [Retrieved on Sep. 24, 2001] from the Internet: on http://proquest.umi.com/, ProQuest Document ID: 469993761.

"TradeStation Securities Announces Launch of New TradeStations.com Web Site" [online], *PR Newswire*, New York: Mar. 4, 2003, p. 1. [Retrieved on Sep. 4, 2008] from the Internet: on http://proquest.umi.com/, ProQuest Document ID: 298571441.

Written Opinion for Singapore Patent Application No. 11-2015-07355U, dated Feb. 25, 2016 (mailed Mar. 15, 2016).

Written Opinion & Search Report in Singapore Patent Application No. 11-2015-07355U, dated Nov. 8, 2016 (mailed Nov. 12, 2016).

* cited by examiner

TRADING CIRCLES

CROSS REFERENCE TO RELATED APPLICATIONS

This application is a continuation of U.S. patent application Ser. No. 15/852,625, filed Dec. 22, 2017, now U.S. Pat. No. 11,354,737, which is a continuation of U.S. patent application Ser. No. 14/314,427, filed Jun. 25, 2014, now U.S. Pat. No. 10,102,576, which is a continuation of U.S. patent application Ser. No. 13/839,369, filed Mar. 15, 2013, now U.S. Pat. No. 8,799,143, the contents of each of which are fully incorporated herein by reference for all purposes.

BACKGROUND

An electronic trading system generally includes a trading device in communication with an electronic exchange. The electronic exchange transmits market data to the trading device. Market data includes, for example, price data, market depth data, last traded quantity data, and/or other data related to a market for a tradeable object. In some electronic trading systems, the trading device sends trade orders to the electronic exchange. A trade order may include, for example, a price, a quantity, one or more order thresholds or limits, and/or other data provided to the electronic exchange and related to transactions involving one or more of the tradeable objects. Upon receiving a trade order, the electronic exchange may enter the trade order into an exchange order book and attempt to match quantity of the trade order with quantity of one or more contra-side trade orders.

BRIEF DESCRIPTION OF THE FIGURES

Certain embodiments are disclosed with reference to the following drawings.

Figure 1:
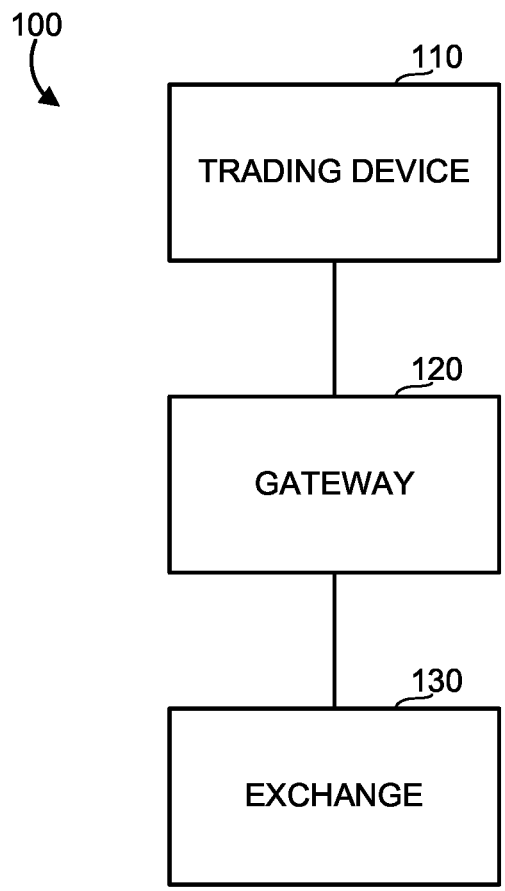
FIG. 1 illustrates a block diagram of an example electronic trading system in which embodiments disclosed herein may be employed.

Certain embodiments will be better understood when read in conjunction with the provided drawings, which illustrate examples. It should be understood, however, that the embodiments are not limited to the arrangements and instrumentality shown in the attached drawings.

DETAILED DESCRIPTION

Although the following discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, the disclosed embodiments may be implemented in other ways.

Disclosed embodiments provide mechanisms and processes to define and establish trading circles that link or group two or more users. Trading circles (also referred to as "circles") may be defined and established utilizing one or more common characteristic or parameter to identify each of the individual users as a member of the circle. For example, users within a company may be aggregated to define a circle; users trading a common tradeable objects may be linked to define a circle; users communicating via a common communications network may define a circle; users trading one or more related tradeable objects may define a circle; and users trading with a certain frequency or volume may define a circle. Alternatively, a user may elect to join one or more existing circles and/or to establish a new circle based on, for example, one or more particular preference, requirement and/or characteristic common to the members of the new circle.

Once a trading circle has been established, disclosed embodiments facilitate communication of circle data associated with a first member to the other members of the circle. For example, when a member of a circle communicates a trade order to the electronic exchange, embodiments disclosed herein facilitate communication of circle data related to the trade order data to some or all of the members of the trading circle. The circle data may include trade order data such as an offer price, a purchase price, quantity data, order thresholds or limits, and/or any data provided to the electronic exchange and related to the purchase or sale of a tradeable object. Circle data may further include price data, market depth data, last traded quantity data, and/or other data related to a market for the tradeable object. In some examples, circle data may include information related to the condition and/or operation of the market into which the trade is to be placed. For example, circle data could include latency information based on the calculated round-trip time between the trading device and exchange. The shared latency information within the circle data can be utilized to evaluate network performance and route orders in an attempt to limit in-flight delays. Similarly, circle data could include rejection and/or throttling information specific to a given exchange. In this way, the circle data may be utilized to share market performance information and/or market characteristics with members of the circle.

Circle data representing a potential change in the market may be communicated to the members of the trading circle allowing for consideration and/or action upon the potential market changing information before most non-members receive updated market data from the electronic exchange. In this way, members of a trading circle are able to act immediately based on information contained and communicated within the circle data while the actions of non-members of the trading circle are delayed until the updated market data is received from the electronic exchange. For example, when a first circle member sends a twenty (20) lot order for a certain tradeable object, circle members are informed that the available quantity of that tradeable object is likely to soon decrease by at least the twenty (20) lot order submitted by the first circle member. Additionally, when a first circle member receives an exchange notification, such as a rejection or fill notification, circle members are informed of the notification. Additional and alternative examples are described detail below.

The communication of circle data may be facilitated by a point-to-point connection between the members of the trading circle, or may be controlled or directed via one or more centralized hubs such as a gateway or other suitable network device.

Disclosed embodiments relate to establishing one or more trading circles and facilitating communication of circle data among the members of the one or more trading circles. Using disclosed embodiments, a trading circle can be formed to include, for example, members of a trading entity such as a collection of brokers, individual traders, members of a social networking group, or any other type of user. As members of a trading circle perform trading activities and/or receive notifications from the exchange (for example, via a trading device or application), disclosed embodiments communicate circle data related to the performed activity and/or notifications to other members of the circle. For example, when a first member of a trading circle sends an order to an exchange or otherwise interacts with the exchange, one or more disclosed embodiments are configured to send circle data containing at least one indication of the order or interaction to a second member of the trading circle in conjunction with (for example, at the same time as) the order being sent to the electronic exchange. Members of other circles, unaligned individuals and any other non-member of the trading circle are not informed of the sent order, the interaction with the exchange or any effect the performed market activity may have at the exchange until the exchange processes the order. As a result, fellow members of a trading circle are provided with circle data related interactions with the exchange performed by other members of the trading circle earlier than non-members of the trading circle. Thus, disclosed embodiments enable members of the same trading circle to receive information related to the prospective market activity of any one member of the circle without having to wait for the exchange to process the performed activity. The improved communication of trading data between circle members provided by the disclosed embodiments is described in greater detail herein.

Additionally, disclosed embodiments provide mechanisms and processes to develop and/or share market data that may not be provided or otherwise available from the electronic exchange. For example, exchanges often limit the number of price levels for which quantity data is disseminated beyond the best bid and the best price. In some examples, the exchange disseminates quantity data at four price levels in one direction from the best bid/price and four price levels in the opposite direction from the best bid/price. In such instances, users interacting with the exchange are provided with an incomplete view of the market because the exchange does not disseminate price information beyond the limited number of price levels (for example, eight price levels). Disclosed embodiments facilitate communication among trading circle members of price information beyond the limitations imposed by the exchange. As described in detail below, disclosed embodiments utilize price information associated with working orders of one or more individual members of a trading circle to provide the other members of the circle with a more complete view of the market. For example, when the exchange only disseminates quantity information for the eight price levels nearest the best bid/price, disclosed embodiments may develop and/or disseminate quantity information among members of the trading circle related to twenty (or more) price levels nearest the best bid/price or all of the price levels. In such instances, disclosed embodiments provide the members of the trading circle with a more complete view of the market than is provided to non-circle members by the exchange alone. Additionally or alternatively, disclosed embodiments use price information associated with one or more individual members of the trading circle together with the price information disseminated by the exchange to generate extrapolated price information for the portion of the market for which the exchange is not currently disseminating price information. In such instances, disclosed embodiments provide each of the members of the trading circle with an approximation of the full view of the market. The expansions of price information provided by disclosed embodiments are described in greater detail below.

Additionally, disclosed embodiments provide members of the trading circle with indications that a working order or at least a portion of a working order is likely to be filled based on market activity taken by other members of the trading circle. As described in greater detail below, disclosed embodiments analyze working orders of the members of the trading circle to identify instances in which one or more other members of the trading circle have working orders for the same tradeable object, for example. When the identified working orders are complimentary types of orders (one order is a buy order and the other order is a sell order), disclosed embodiments determine whether the complimentary orders are likely to result in one or more fills. The likely fill identified by disclosed embodiments is sometimes referred to herein as a theoretical fill. Disclosed embodiments inform the member of the trading circle of the theoretical fill without the individual members of the trading circle having to wait for the exchange to process the orders. As a result, the individual members of the trading circle receiving the theoretical fill indication are made aware of likely market conditions or positions resulting from the theoretical fill more rapidly than having to wait for the exchange to process market data. The indications of likely order fulfillment provided by disclosed embodiments are described in greater detail below.

Certain embodiments provide a method for defining a group having a plurality of members, wherein one or more of the plurality of members interacts with an exchange that facilitates market transactions; detecting a first interaction of a first group member with the exchange; and communicating, in response to detecting the first interaction, data related to the first interaction to a second group member before the first group member receives confirmation of the first interaction from the exchange.

Certain embodiments provide a tangible computer readable storage medium including instructions that, when executed, cause a computing device to define a group having a plurality of members, wherein one or more of the plurality of members interacts with an exchange that facilitates market transactions; detect a first interaction of a first group member with the exchange; and communicate, in response to detecting the first interaction, data related to the first interaction to a second group member before the first group member receives confirmation of the first interaction from the exchange.

Certain embodiments provide an apparatus including: a definer to define a group having a plurality of members, wherein one or more of the plurality of members interacts with an exchange that facilitates market transactions; a detector to detect a first interaction of a first group member with the exchange; and a communicator to, in response to the detector detecting the first interaction, convey data related to the first interaction to a second group member before the first group member receives confirmation of the first interaction from the exchange.

Certain embodiments provide a method including defining a group having a plurality of members, wherein one or more of the plurality of members interacts with an exchange that disseminates data related to a range of price levels; collecting data related to a working order of a first group member at a first price level outside the disseminated range; and communicating the collected data to a second group member.

Certain embodiments provide a tangible computer readable storage medium including instructions that, when executed, cause a computing device to define a group having a plurality of members, wherein one or more of the plurality of members interacts with an exchange that disseminates data related to a range of price levels; collect data related to a working order of a first group member at a first price level outside the disseminated range; and communicate the collected data to a second group member.

Certain embodiments provide an apparatus including a definer to define a group having a plurality of members, wherein one or more of the plurality of members interacts with an exchange that disseminates data related to a range of price levels; an expander to collect data related to a working order of a first group member at a first price level outside the disseminated range; and a communicator to communicate the collected data to a second group member.

I. Example Electronic Trading System

FIG. 1 illustrates a block diagram of an example electronic trading system 100 in which certain embodiments may be employed. The system 100 includes a trading device 110, a gateway 120, and an electronic exchange 130. The trading device 110 is in communication with the gateway 120. The gateway 120 is in communication with the exchange 130.

As used herein, the phrase "in communication with" may include in direct communication and indirect communication through one or more intermediary components.

In operation, the trading device 110 may send orders to buy or sell tradeable objects at the exchange 130. For example, a user may utilize the trading device 110 to send the orders. The orders are sent through the gateway 120 to the exchange 130. In addition, market data is sent from the exchange 130 through the gateway 120 to the trading device 110. The user may also utilize the trading device 110 to monitor this market data and/or base a decision to send an order for a tradeable object on the market data.

A tradeable object is anything which may be traded with a quantity and/or a price. For example, financial products, including stocks, options, bonds, futures, currency, warrants, funds derivatives, securities, commodities, swaps, interest rate products, index based products, traded events, goods, and collections and/or combinations of these, may be tradeable objects. A tradeable object may be "real" or "synthetic." A real tradeable object includes products that are listed and/or administered by an exchange. A synthetic tradeable object includes products that are defined by the user. For example, a synthetic tradeable object may include a combination of real (or other synthetic) products such as a synthetic spread created by a user utilizing a trading device 110. There may be a real tradeable object that corresponds and/or is similar to a synthetic trading object.

The trading device 110 may include one or more electronic computing platforms such as a hand-held device, laptop, desktop computer, workstation with a single or multi-core processor, server with multiple processors, and/or cluster of computers, for example. For example, while logically represented as a single device, trading device 110 may include a trading terminal in communication with a server, where collectively the trading terminal and the server are the trading device 110. The trading terminal may provide a trading screen to a user and may communicate commands to the server for further processing of the user's inputs through the trading screen, such as placing orders.

The trading device 110 is generally owned, operated, controlled, programmed by, configured by, or otherwise used by a user. As used herein, the phrase "user" may include, but is not limited to, a human (for example, a trader) or an electronic trading device (for example, an algorithmic trading system or trading application). One or more users may be involved in the ownership, operation, control, programming, configuration, or other use, for example.

The trading device 110 may include one or more trading applications. The trading application(s) may, for example, process market data by arranging and displaying the market data in trading and charting windows. The market data may be received from exchange 130, for example. As another example, the market data may be received from a simulation environment that provides historical data and/or simulates an exchange but does not effectuate real-world trades. This processing may be based on user preferences, for example. The trading application(s) may include an automated trading tool such as an automated spread trading tool, for example. The one or more trading applications may be distributed across one or more of the computing devices of the trading device 110. For example, certain components of a trading application may be executed on a trading workstation and other components of the trading application may be executed on a server in communication with the workstation.

The trading device 110 may include an electronic trading workstation, a portable trading device, an algorithmic trading system such as a "black box" or "grey box" system, an embedded trading system, and/or an automated trading tool, for example. For example, the trading device 110 may be a computing system running a copy of X_TRADER®, an electronic trading platform provided by Trading Technologies International, Inc. of Chicago, Ill. As another example, the trading device 110 may be a computing device running an automated trading tool such as AUTOSPREADER® and/or AUTOTRADER™, also provided by Trading Technologies International, Inc.

As another example, the trading device 110 may include a trading application which algorithmically processes market data and includes a user interface for manual placement of orders based on the algorithmic processing or to manipulate orders that were placed automatically. An algorithmic trading application is a trading application which includes an automatically processed algorithm to perform certain actions. That is, the trading application includes an automated series of instructions to perform defined action(s). The actions may include processing market data in a particular way, placing an order, modifying an existing order, deleting an order, refraining from placing an order, selecting which tradeable object(s) to act on, determining a price to place or modify an order at, determining a quantity to place an order at or modify an order to be, determining whether an order should be to buy or sell, and delaying action for a period of time, for example.

As used herein, an algorithm (also referred to as a trading algorithm) is specified by a definition which includes logic expressions and parameters that describe the algorithm to be used in trading. Logic expressions specify the relationship between parameters and may generate more parameters. Parameters may include, for example, inputs into the logic expressions of the algorithm. The definition of an algorithm may be, at least in part, specified by the algorithmic trading application. For example, an algorithmic trading application may allow a user to only specify parameters to be used by pre-defined logic expressions. As another example, an algorithmic trading application may allow a user to specify some or all of the logic expressions and some or all of the parameters. A trading algorithm where the logic expressions are specified by a user is a user-defined trading algorithm.

Trading applications may be stored in a computer readable medium of the trading device 110. In certain embodiments, one or more components of a trading application may be stored on a trading workstation and other components of the trading application may be stored on a server in communication with the workstation. In certain embodiments, one or more components of a trading application may be loaded into the computer readable medium of the trading device 110 from another computer readable medium. For example, the trading application (or updates to the trading application) may be stored by a manufacturer, developer, or publisher on one or more CDs or DVDs, which are then provided to someone responsible for loading the application onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 ("pull distribution") and/or un-requested by the trading device 110 ("push distribution").

The trading device 110 is adapted to send orders for a tradeable object. The orders may be sent in one or more messages or data packets or through a shared memory system, for example. The trading device 110 may also be adapted to cancel orders, change orders, and/or query an exchange, for example. As another example, the trading device 110 may be adapted to send orders to a simulated exchange in a simulation environment that does not effectuate real-world trades.

The orders sent by the trading device 110 may be sent at the request of a user or automatically, for example. For example, a trader may utilize an electronic trading workstation to place an order for a particular tradeable object, manually providing one or more parameters for the order, such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the trading device 110 includes a user interface. The user interface may include one or more display devices for presenting a text-based and/or graphical interface of a trading application to a user, for example. For example, the display devices may include computer monitors, hand-held device displays, projectors, and/or televisions. The user interface may be used to specify or review parameters for an order using a trading application. The user interface may include one or more input devices for receiving input, for example. For example, the input devices may include a keyboard, trackball, two or three-button mouse, and/or touch screen. The user interface may include other devices for interacting with a user. For example, information may be audibly provided to a user through a speaker and/or received through a microphone.

In certain embodiments, a trading application includes one or more trading screens to enable a user to interact with one or more markets. Trading screens may enable users to obtain and view market information, set order entry parameters, enter and cancel orders, and/or monitor positions while implementing various trading strategies, for example. For example, a trading application may receive information (such as bid prices, bid quantities, ask prices, ask quantities, prices and quantities for past sales, and/or other market related information) from exchange 130, some or all of which, in turn, may be displayed with a user interface of trading device 110. Based on the received information, the trading screen may display a range of price levels and corresponding bid and ask quantities for the price levels in regard to tradeable objects. In order to provide the user with pertinent trading information, the trading screen may display a range of prices (and the corresponding bid and ask quantities) around the inside market. The information may be continuously or regularly provided to the trading application, which allows the trading application to update the trading screen with current market information. A user may use the trading screen to place buy and sell orders for tradeable objects or to otherwise trade the tradeable objects based on the displayed information, for example.

Trading screens may display one or more trading tools. Trading tools are electronic tools that allow, assist with, and/or facilitate electronic trading. Exemplary trading tools include, but are not be limited to, charts, trading ladders, order entry tools, automated trading tools, automated spreading tools, risk management tools, order parameter tools, order entry systems, market grids, fill windows, and market order windows, combinations thereof, other electronic tools used for trading, preparing to trade, managing trades, or analyzing the market.

In certain embodiments, the orders from the trading device 110 are sent to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 is adapted to communicate with the trading device 110 and the exchange 130. The gateway 120 facilitates communication between the trading device 110 and the exchange 130. For example, the gateway 120 may receive orders from the trading device 110 and transmit the orders to the exchange 130. As another example, the gateway 120 may receive market data from the exchange 130 and transmit the market data to the trading device 110.

In certain embodiments, the gateway 120 performs processing on data communicated between the trading device 110 and the exchange 130. For example, the gateway 120 may process an order received from the trading device 110 into a data format understood by the exchange 130. Similarly, the gateway 120 may transform market data in an exchange-specific format received from the exchange 130 into a format understood by the trading device 110. The processing of the gateway 120 may also include tracking orders from the trading device 110 and updating the status of the order based on fill confirmations received from the exchange 130, for example. As another example, the gateway 120 may coalesce market data from the exchange 130 and provide it to the trading device 110.

In certain embodiments, the gateway 120 provides services other than processing data communicated between the trading device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

In general, the exchange 130 may be owned, operated, controlled, or used by an exchange entity. Example exchange entities include the CME Group, the New York Stock Exchange/London International Financial Futures and Options Exchange ("NYSE LIFFE"), the Intercontinental Exchange ("ICE"), and Eurex. The exchange 130 may include an electronic matching system, such as a computer, server, or other computing device, that is adapted to allow tradeable objects, for example, offered for trading by the exchange, to be bought and sold. The electronic matching system may include a matching engine, for example. The exchange 130 may include separate entities, some which list and/or administer tradeable objects and others which receive and match orders, for example. The exchange 130 may include an electronic communication network ("ECN"), for example.

The exchange 130 is adapted to match orders to buy and sell tradeable objects. The tradeable objects may be listed for trading by the exchange 130. The orders may include orders received from the trading device 110, for example. Orders may be received from the trading device 110 through the gateway 120, for example. In addition, the orders may be received from other devices in communication with the exchange 130. That is, typically the exchange 130 will be in communication with a variety of other trading devices (which may be similar to trading device 110) that also provide orders to be matched.

The exchange 130 is adapted to provide market data. The market data may be provided in one or more messages or data packets or through a shared memory system, for example. The market data may be provided to the trading device 110, for example. The market data may be provided to the trading device 110 through the gateway 120, for example. The market data may include data that represents the inside market, for example. The inside market is the lowest sell price (also referred to as the "best ask") and the highest buy price (also referred to as the "best bid") at a particular point in time (since the inside market may vary over time). The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on both sides of the inside market. As another example, market depth may be provided for the first ten price levels at which quantity is available in the market. The market data may also include information such as the last traded price (LTP), the last traded quantity (LTQ), and order fill information.

In certain embodiments, the system 100 includes more than one trading device 110. For example, multiple trading devices similar to the trading device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the trading device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the trading device 110 to trade at more than one exchange through the gateway 120, for example.

In certain embodiments, the system 100 includes more than one exchange 130 and more than one gateway 120. For example, multiple gateways similar to the gateway 120, discussed above, may be in communication with multiple exchanges similar to the exchange 130, discussed above. Each gateway may be in communication with one or more different exchanges, for example. Such an arrangement may allow one or more trading devices 110 to trade at more than one exchange (and/or provide redundant connections to multiple exchanges), for example.

In certain embodiments, the trading device 110 includes one or more computing devices or processing components. In other words, the functionality of the trading device 110 may be performed by more than one computing device. For example, one computing device may generate orders to be sent to the exchange 130 while another computing device may provide a graphical user interface to a user. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the trading device 110. For example, the components of the gateway 120 may be part of the same computing platform as the trading device 110. As another example, the functionality of the gateway 120 may be performed by components of the trading device 110. In certain embodiments, the gateway 120 is not present. Such an arrangement may occur when the trading device 110 does not need to utilize the gateway 120 to communicate with the exchange 130, for example. For example, if the trading device 110 has been adapted to communicate directly with the exchange 130.

In certain embodiments, the gateway 120 is physically located at the same site as the trading device 110. In certain embodiments, the gateway 120 is physically located at the same site as the exchange 130. In certain embodiments, the trading device 110 is physically located at the same site as the exchange 130. In certain embodiments, the gateway 120 is physically located at a site separate from both the trading device 110 and the exchange 130.

In certain embodiments, the system 100 may include other devices that are specific to the communications architecture such as middleware, firewalls, hubs, switches, routers, exchange-specific communication equipment, modems, security managers, and/or encryption/decryption devices.

II. Example Computing Device

Figure 2:
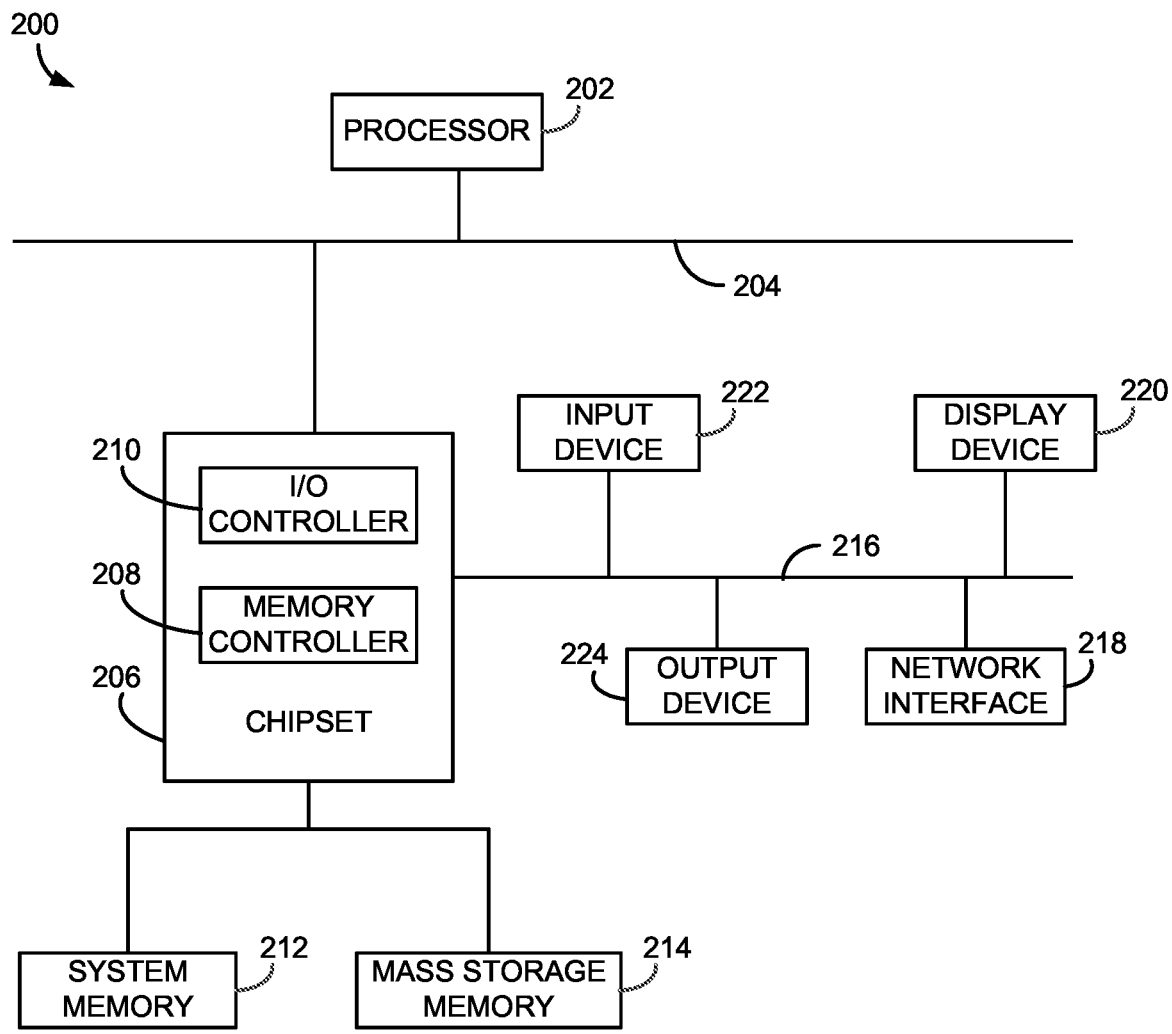
FIG. 2 illustrates a block diagram of an example computing device that may be used to implement the disclosed embodiments.

FIG. 2 illustrates a block diagram of an example computing device 200 that may be used to implement the disclosed embodiments. The trading device 110 of FIG. 1 may include one or more computing devices 200, for example. The gateway 120 of FIG. 1 may include one or more computing devices 200, for example. The exchange 130 of FIG. 1 may include one or more computing devices 200, for example.

The computing device 200 includes a processor 202, an interconnection bus 204, a chipset 206, a memory controller 208, an input/out (I/O) controller 210, a system memory 212, a mass storage memory 214, an I/O bus 216, a network interface 218, a display 220, an input device 222, and an output device 224. The computing device 200 may include additional, different, or fewer components. For example, multiple buses, multiple processors, multiple memory devices, multiple network interfaces, multiple display devices, multiple input devices, multiple output devices, or any combination thereof, may be provided. As another example, the computing device 200 may not include an output device 224 separate from the display device 220. As another example, the computing device 200 may not include a display device 220. As another example, the computing device 200 may not include an input device 222. Instead, for example, the computing device 200 may be controlled by an external or remote input device via the network interface 218.

The computing device 200 includes a processor 202 that is coupled to an interconnection bus 204. The interconnection bus 204 may include a communication bus, channel, network, circuit, switch, fabric, or other mechanism for communicating data between components in the computing device 200. The interconnection bus 204 may be communicatively coupled with and transfer data between any of the components of the computing device 200. For example, during an installation process of a trading application, one or more computer-readable instructions that are to be executed by the processor 202 may be transferred from the input device 222 and/or the network interface 218 to the system memory 212 and/or the mass storage memory 214. When the computing device 200 is running or preparing to run the trading application stored in the system memory 212 and/or the mass storage memory 214, the processor 202 may retrieve the instructions from the system memory 212 and/or the mass storage memory 214 via the interconnection bus 204.

The processor 202 may be a processor, processing unit, or microprocessor, for example. The processor 202 may include one or more general processors, digital signal processors, application specific integrated circuits, field programmable gate arrays, analog circuits, digital circuits, programmed processors, and/or combinations thereof, for example. The processor 202 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. The computing device 200 may be a multi-processor system and, thus, may include one or more additional processors that are communicatively coupled to the interconnection bus 204.

The processor 202 may be operable to execute logic encoded in one or more tangible media, such as the system memory 212, the mass storage memory 214, and/or via the network interface 218. As used herein, logic encoded in one or more tangible media includes instructions that are executable by the processor 202 or a different processor. The logic may be stored as part of software, hardware, integrated circuits, firmware, and/or micro-code, for example. The logic may be received from an external communication device via a communication network, for example, connected to the Internet. The processor 202 may execute the logic to perform the functions, acts, or tasks illustrated in the figures or described herein.

The processor 202 of FIG. 2 is coupled to the chipset 206, which includes the memory controller 208 and the I/O controller 210. A chipset typically provides I/O and memory management functions as well as a plurality of general purpose and/or special purpose registers and timers that are accessible or used by one or more processors coupled to the chipset 206. The memory controller 208 performs functions that enable the processor 202 (or processors if there are multiple processors) to access the system memory 212 and the mass storage memory 214.

The system memory 212 and the mass storage memory 214 may be one or more tangible media, such as computer readable storage media, for example. The system memory 212 may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, any other tangible data storage device, any combination thereof. The mass storage memory 214 may include various types of mass storage devices including, for example, a hard disk drive, optical media, magnetic tape, any other tangible data storage device, or any combination thereof. In certain embodiments, the system memory 212 and the mass storage memory 214 are non-transitory.

The system memory 212 and the mass storage memory 214 may be a single memory module, for example. The system memory 212 and the mass storage memory 214 may be adjacent to, part of, programmed with, networked with, and/or remote from processor 202, such that data stored in the system memory 212 and the mass storage memory 214 may be retrieved and processed by the processor 202, for example. The system memory 212 and the mass storage memory 214 may store instructions that are executable by the processor 202. The instructions may be executed to perform one or more of the acts or functions described herein or shown in the figures.

The I/O controller 210 performs functions that enable the processor 202 to communicate with the network interface 218, the display 220, the input device 222, and the output device 224 through an I/O bus 216. While the memory controller 208 and the I/O controller 210 are depicted in FIG. 2 as separate blocks within the chipset 206, the functions performed by these blocks may be integrated within a single semiconductor circuit or may be implemented using two or more separate integrated circuits. One or more of the components of the computing device 200 may be implemented as a system on a chip (for example, a system on a chip in an IPHONE™).

The network interface 218 may be a one-way or two-way communication coupling. Accordingly, the network interface 218 may communicatively connect one, two, or more communication networks or devices. For example, the interconnection bus 204 may be coupled with a gateway similar to gateway 120 of FIG. 1 discussed above via the network interface 218, such that one, some, or all of the components of the computing device 200 are accessible or may communicate with the gateway. As another example, the network interface 218 may couple the interconnection bus 204 with other communication networks. The network interface 218 may be, for example, an integrated services digital network (ISDN) card or a modem to provide a data communication connection. As another example, network interface 218 may be a local area network (LAN) card to provide a data communication connection to a compatible LAN, for example, connected to the Internet. Wireless links may also be implemented. The network interface 218 may send and receive electrical, electromagnetic, or optical signals that carry analog or digital data streams representing various type of information, for example.

The display device 220 may include a visual output device, cathode ray tube (CRT) display, electronic display, electronic paper, flat panel display, light-emitting diode (LED) display, electroluminescent display (ELD), plasma display panel (PDP), liquid crystal display (LCD), thin-film transistor display (TFT), organic light-emitting diode display (OLED), surface-conduction electron-emitter display (SED), laser television, carbon nanotubes, nanocrystal display, head-mounted display, projector, three-dimensional display, and/or transparent display device, for example.

The display device 220 is adapted to display a trading screen. The trading screen may be similar to the trading screens discussed above, for example. The trading screen may be interactive. An interactive trading screen may allow, for example, one or more trading actions to be performed using the trading screen. For example, an interactive trading screen may allow one or more order entry parameters to be set and/or sent using one or more order entry actions. The display device 220 and/or the input device 222 may be used to interact with the trading screen, for example.

The input device 222 may include a keyboard, mouse, microphone, touch-screen, trackball, keypad, joystick, and/or other device for providing input, for example. The input device 222 may be used, for example, to provide command selections to processor 202. For example, the input device 222 may be a mouse that is used to control a cursor displayed on a trading screen. The mouse may include one or more buttons for selection and control, for example.

The output device 224 may include a keyboard, mouse, speakers, touch-screen, trackball, keypad, haptic device or system, joystick, and/or other device for providing output, for example. For example, the output device 224 may be used to output one or more signals, such as a haptic signal or an audio signal, to a user. While the input device 222 and output device 224 are depicted in FIG. 2 as separate blocks, the functions performed by these blocks may be integrated into a single I/O device.

III. Communication of Trading Data to Members of a Trading Circle

Figure 3:
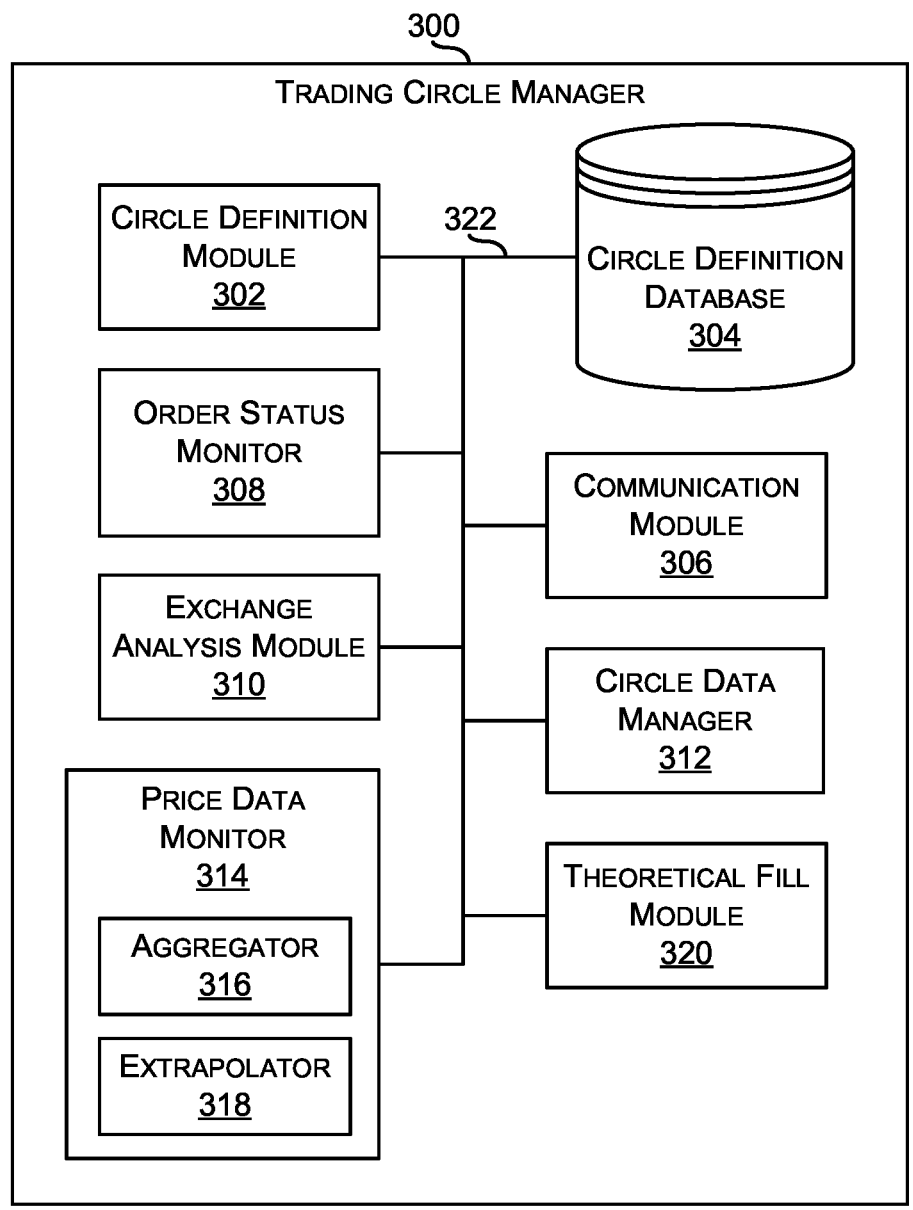
FIG. 3 illustrates a block diagram of an example apparatus that may be used to implement an example trading circle manager.

FIG. 3 illustrates an example trading circle manager 300 that may be used to implement certain embodiments disclosed herein. In certain embodiments, the example trading circle manager 300 of FIG. 3 is implemented on or in connection with the example trading device 110 of FIG. 1. In certain embodiments, the trading circle manager 300 comprises a separate computing device adapted to cooperate with the trading device 110 of FIG. 1, such as a server or gateway, for example. In other embodiments, the trading circle manager 300 comprises executable instructions or code that may be implemented or otherwise run by the example trading device 110 of FIG. 1.

In some embodiments, an instance of the example trading circle manager 300 of FIG. 3 is implemented for each circle (sometimes referred to herein as a group) and the respective trading circle managers 300 can be dedicated to the corresponding trading circle. The example trading circle manager 300 of can manage a plurality of circles for one or more otherwise unrelated individuals or entities.

The example trading circle manager 300 enables a user of, for example, the trading device 110 of FIG. 1 and other trading devices to define and establish one or more trading circles with other users for the purpose of communicating trading data among circle members. The communication of trading data between members of a trading circle is facilitated by the example trading circle manager 300 to provide trading data to members of the circle without waiting for an exchange to process information received in connection with the trade data and generate an appropriate response (for example, provide a notification in response to a submission). As a result, members of the trading circle receive trading data associated with other members faster than current systems. In current systems, users interacting with an exchange wait for the exchange to process orders and/or other transactions before becoming aware that another user or entity placed the order or initiated the transaction. In contrast to current systems, the example trading circle manager 300 provides members of a circle with data related to, for example, an order placed by a fellow circle member at an exchange without the receiving members of the circle having to wait for the exchange to process and disseminate data related to the order.

For example, when a first member of a circle established and managed by the example trading circle manager 300 of FIG. 3 has a first order working at an exchange that involves a first tradeable object, a second member of the same trading circle may submit a second order to the exchange that involves the same first tradeable object. In current systems, to become aware of the second order, the first circle member would have to wait for the exchange to process the order submitted by the second circle member and to disseminate information related to changes at the market caused by the second order. Conversely, the example trading circle manager 300 conveys data related to the second order to the first circle member as soon as the second order is sent to the exchange by the second circle member (or a trading device associated with and/or utilized by the second circle member). In other words, the example trading circle manager 300 conveys an indication of the second order for example, the indication may include details of the second order) in conjunction with (for example, at the same or substantially the same time as) the second order being sent to the exchange. As a result, the example trading circle manager 300 causes the first circle member to receive data related to the first tradeable object and an estimate or projection of the effects of first tradeable object on the exchange without the first circle member having to wait for the exchange to process the second order of the second circle member.

Members of a circle receiving trading data from fellow members of the same circle via the example trading circle manager 300 of FIG. 3 have a distinct advantage over non-circle members with regards to market activity performed by the other circle members. In particular, individuals and/or entities organized into trading circles and utilizing the example trading circle manager 300 are likely to receive trading data before non-members. To continue the above example, by utilizing the example trading circle manager 300 the first circle member receives data related to the second order submitted by the second circle member (for example, price and quantity information contained within the second order and/or an indication that an additional order has been submitted in connection with the first tradeable object) at a first time, while a non-member is more likely to receive data related to the second order at a second time that is later than the first time. In such instances, the first time corresponds to a time at which the second order is sent to the exchange, while the second time corresponds to a time after the exchange has received the second order, processed the second order, and disseminated data related to the processing of the second order. The first member of the circle can, in turn, utilize the period of time between the first and second times provided by the example trading circle manager 300 to take one or more actions in connection with, for example, the first tradeable object before the non-member is even aware of the second order.

The example trading circle manager 300 of FIG. 3 includes a circle definition module 302 in communication with a circle definition database 304 via a communication interface 322. The example trading circle manager 300 further incorporates a communications module 306 configured to provide connectivity to the members of the one or more managed and controlled trading circles. For example, the communication module 306 may provide connectivity, in the form of, for example, received or detected trade orders and/or trade order updates, to an order status monitor 308. The order status monitor 308 may be configured to identify trade orders and trader order updates or modifications communicated between individual circle members and, for example, the exchange 130 shown in FIG. 1. In certain examples, an exchange analysis module 310 is arranged in communication with the order status module 308 and other modules and components of the manager 300 and configured to determine the effects of identified trader order communications on the exchange. The trading circle manager 300 further includes a circle data manager 312 configured to cross-correlate the individual position data of each circle member operable within each of the one or more managed and controlled trading circles. The trading circle manager 300 incorporates a price data monitor 314 to comprehensively monitor, increase and/or estimate the trade order data available to the individual circle members comprising each trading circle. The trading circle manager 300 may further incorporate a theoretical fill module 320 configured to synchronize trade order data between individual circle members identified as potential counterparties with respect to a particular tradable object.

The example trading circle manager 300 of FIG. 3 depicts a circle definition module 302 in communication with a circle definition database 304 and configured to establish a circle upon receiving a request from, for example, a user registered with the example trading circle manager 300. Requests to establish a circle can also be received in connection with a user request to register with the example trading circle manager 300. In operation, the example circle definition module 302 prompts the requesting user for information needed to define a trading circle. For example, the circle definition module 302 may request, among other things, information that includes: a trading circle name; an administrator name; one or more admin, circle and user passwords; membership restrictions; selections of pre-defined terms and/or regulations; contact information; an invitation list of desired members; and market information. Membership restrictions can include, for example, restrictions by company, by corporate division, by the asset class being traded, by user title or class (e.g., manager, market maker), by risk limits or any other user definable circle criteria. Additional, different and/or less information may be requested and utilized to define the trading circle according to the requirements established by the user. The example circle definition module 302 uses the provided information to create a definition for the requested trading circle. Creating the definition includes, for example, generating a unique identifier to be assigned to the trading circle and to be used to communicate data within the trading circle (for example, by tagging packets of data with the unique identifier). The example circle definition module 302 adds an entry to the example circle definition database 304 including the generated unique identifier, the information provided by the requesting user, and/or any other suitable information in connection with the entry.

When the information provided by the requesting user includes a list of people and/or entities to invite to the trading circle, the example circle definition module 302 of FIG. 3 sends an invitation to each of the invitees. To send the invitation, the example circle definition module 302 uses contact information provided in connection with the list such as, for example, an email address or social network account identifier (for example, a FACEBOOK® account name). The example circle definition module 302 can include information in the invitation that enables the invitees to access and join the established trading circle. For example, the invitation can include a web address, a trading circle name and a password. The invitation sent by the example circle definition module 302 can also include instructions to visit the web address and to enter the trading circle name and password into corresponding input fields on a web page found at the web address. If an invitee follows the instructions of the invite, the example circle definition module 302 receives an indication association with the invitee and uses the indication to add the corresponding invitee to the established trading circle. Adding an invitee to an established trading circle includes, for example, including identifying information associated with the invitee in the corresponding entry of the definition database 304.

The example trading circle manager 300 can facilitate additional and alternative manners of informing people of the trading circle. That is, people can learn of one or more trading circle through vehicles other than the initial invitation process described above. In some examples, members of the trading circle, administrators and non-administrators alike, can invite people to a trading circle after the trading circle has been established and/or has been operating. Alternatively, people can learn of the trading circle without being inviting. To enable people to opt-in or otherwise request admittance to a trading circle, the example circle definition module 302 may provide a web link or other mechanism to trigger a request submission directed to the trading circle manager 300. The information requested in connection with the submission option provided by the circle definition module 302 can be customizable based on administrator established requirements for each respective trading circle. The example circle definition module 302 receives such opt-in requests and communicates information related to the requests to, for example, a founder or administrator of the corresponding trading circle. The circle definition module 302 waits for a response indicative of whether the person or entity requesting membership in the trading circle is approved. If so, the example circle definition module 302 adds the requesting person or entity to the appropriate entry of the definition database 304. Otherwise, the example circle definition module 302 informs the requesting user that membership has been denied.

Figure 4A:
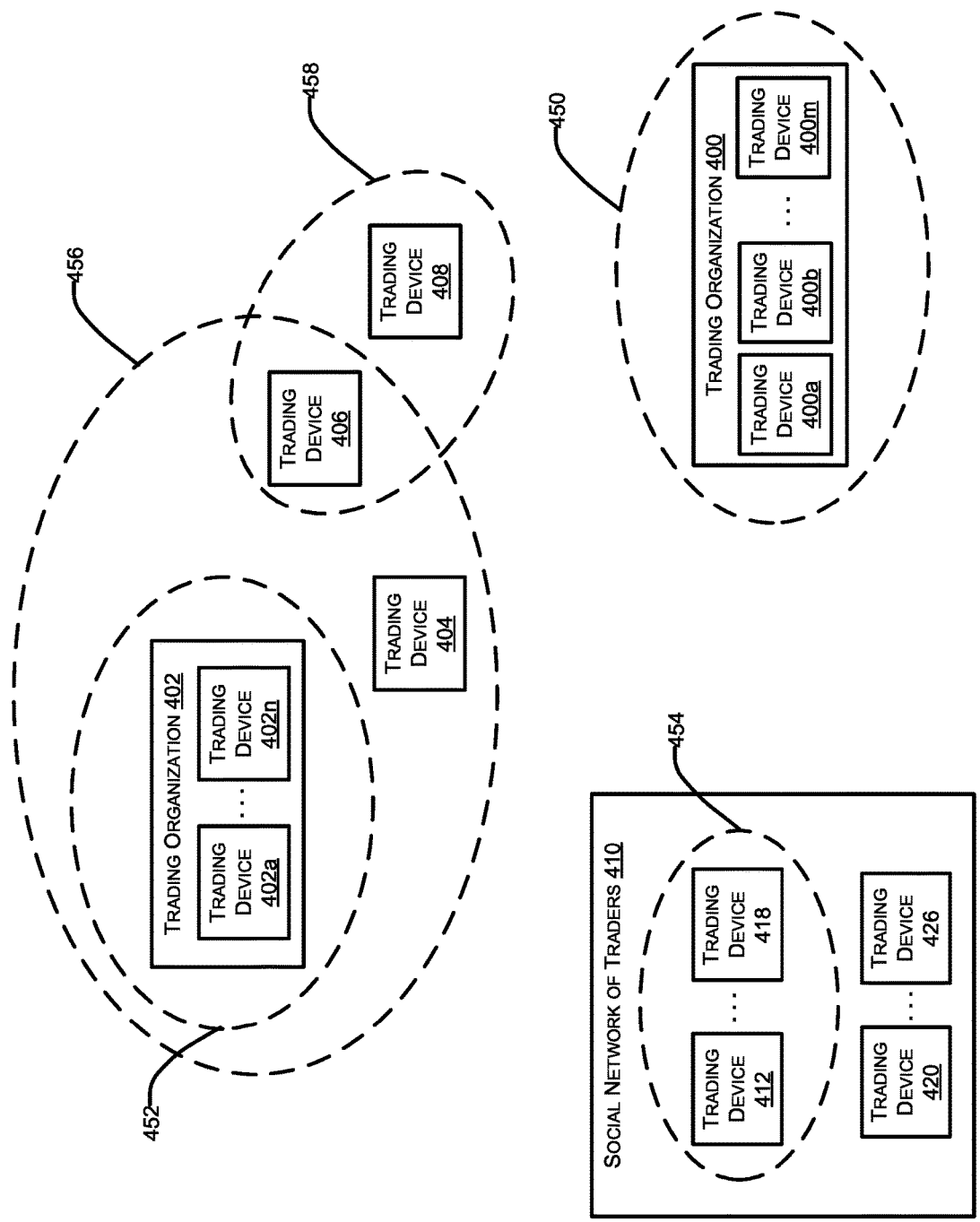
FIGS. 4A to 4C illustrate a plurality of example trading circle configurations defined in the example trading circle manager of FIG. 3.
Figure 4B:
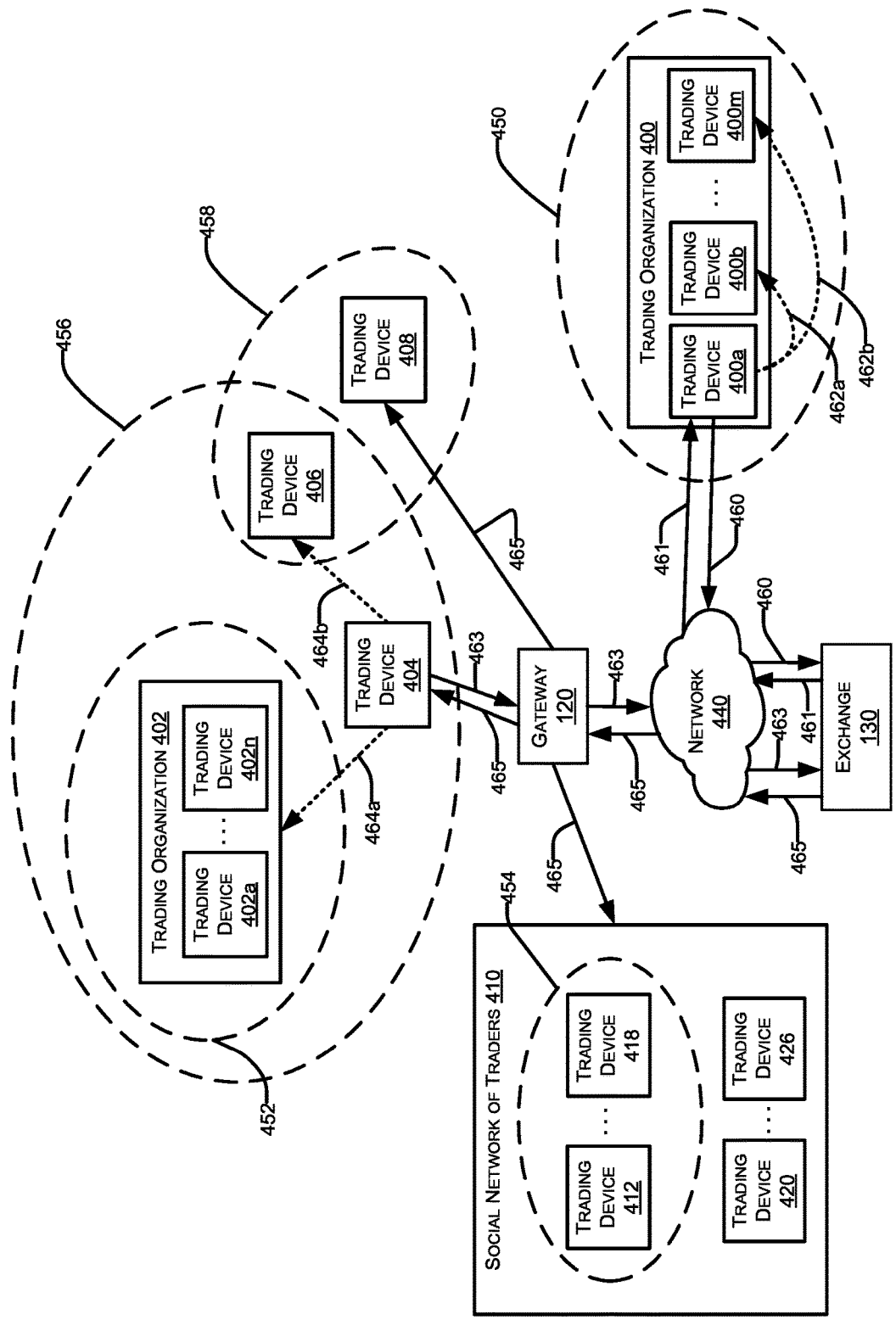
Figure 4C:
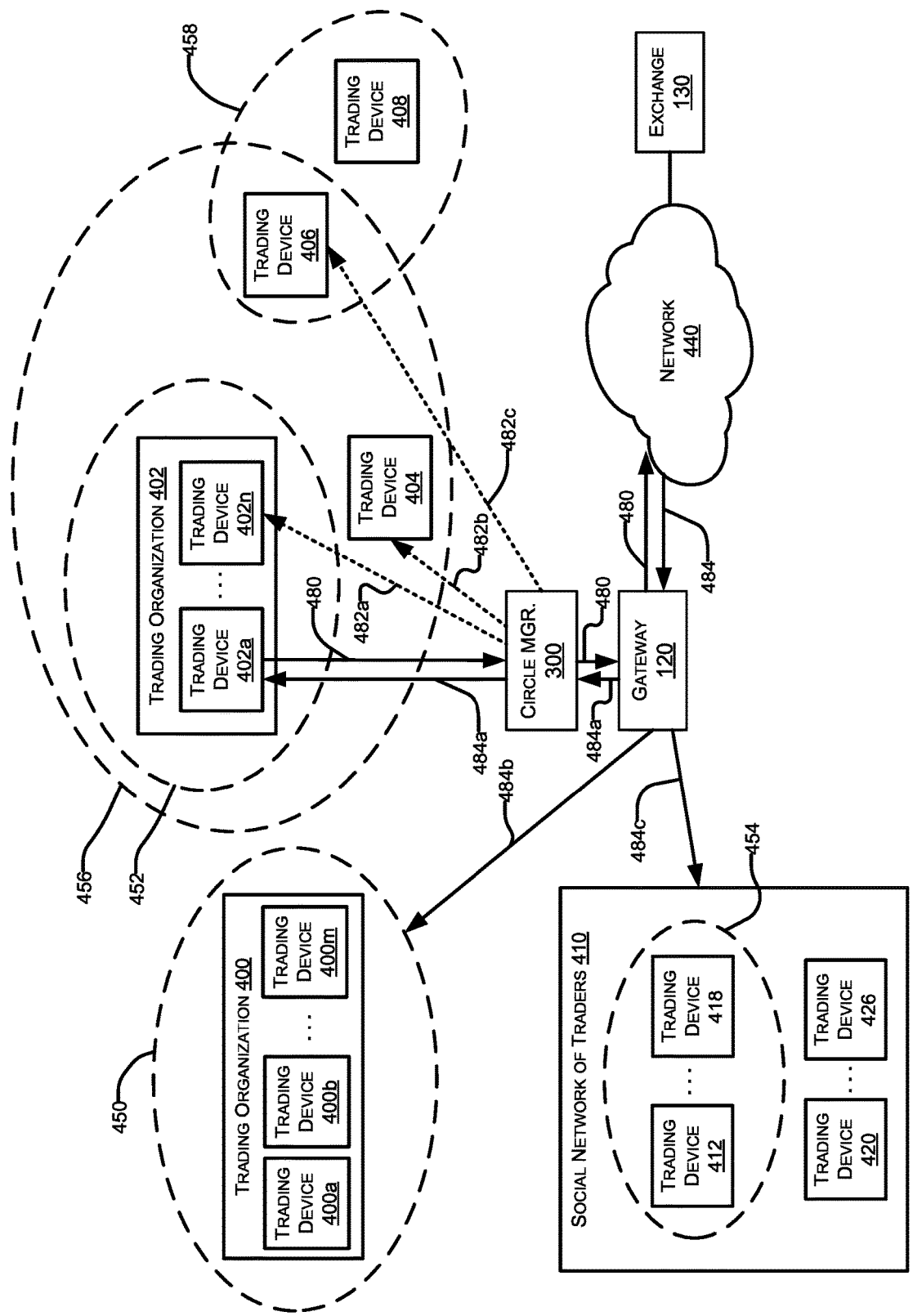

FIGS. 4A to 4C and 5 depict exemplary circle configurations and communication architectures that may be implemented by the trading circle manager 300. FIG. 4A depicts exemplary circle configurations, which may be implemented by the trading circle manager 300 and in accordance with the disclosure provided herein. The features, elements, and capabilities associated with the illustrated circle configurations shown in FIG. 4A are further discussed and explained in connection with the trading circle manager 300 shown in FIG. 3. FIG. 4B depicts an exemplary distributed communication architecture, which may be implemented by the trading circle manager 300 and in accordance with the disclosure provided herein. FIG. 4C depicts an exemplary centralized communication architecture, which may be implemented by the trading circle manager 300 and in accordance with the disclosure provided herein.

The circle definition module 302 establishes trading circles that include any individuals, users and/or trading applications or components possessing one or more of the predefined characteristics associated with each circle. FIG. 4A illustrates a plurality of example trading circles that can be established and managed by the trading circle manager 300. FIG. 4A includes a first trading organization 400 and a second trading organization 402. The first trading organizations 400 employs and/or otherwise represents individual traders and the associated trading devices 400a to 400m, and the second trading organization 402 employs and/or otherwise represents individual traders and the associated trading devices 402a to 402n. The individual trading devices 400a to 400m and 402a to 402n are configured to interact with, for example, the exchange 130 of FIG. 1. The trading devices 400a to 400m and 402a to 402n, as well as the remaining trading devices shown in FIGS. 4A to 4C may be implemented as discussed and described in connection with the trading device 110 shown in FIG. 1. Trading devices 404, 406 and 408 represent individual traders and/or groups of traders unaffiliated with the trading organizations 400 and 402. In certain embodiments, the trading devices depicted in FIGS. 4A to 4C can represent different trading programs operating on the same or difference trading devices. In certain embodiments, the trading devices depicted in FIGS. 4A to 4C represent instances of AUTOSPREADER® and/or AUTOTRADER™ operating on the same or difference trading devices.

The example configuration illustrated in FIG. 4A also includes a social network 410 such as FACEBOOK® or LINKEDIN®, comprising plurality of users and contributors to the same social network service. The social networks may be private networks established for a definite group such as a business or community organization. Individual users of the social network 410 can self-organize in smaller collections and communities using the services of the social network based on shared college attendance, common geographic area, a shared or common interest, etc. In some instances, community members can send messages or post messages that are accessible to other members of the same community. In the example of FIG. 4A, users of the social network 410 include individuals or groups of individuals represented by the trading devices 412 to 418 and 420 to 426.

FIG. 4A further illustrates an example of trading circles that can be established between the discussed and described individual trading devices, trading organizations and social network. A first trading circle 450 encompasses the individuals and trading devices comprising the first trading organization 400. A second trading circle 452 encompasses the individuals and trading devices comprising the second trading organization 402. A third trading circle 454 includes trading devices 412 to 418 representing a subset of the members of the social network 410. A fourth trading circle 456 includes the second trading organization 402 (as well as the second trading circle 452) and the individual trading devices 404 and 406. A fifth trading circle 458 is defined to include individual trading device 408 and trading device 406 of the fourth trading circle 456. The trading device 406 indicates that a single individual and their associated trading device may simultaneously be a member of more than one trading circle (e.g., the fourth trading circle 456 and the fifth trading circle 458.) Additional or alternative trading circles can be formed and managed by the example trading circle manager 300 of FIG. 3. For purposes of discussion, the first trading circle 450 and the trading devices 400a to 400m of the first trading circle 450 are used in the following description. However, the following description and examples disclosed herein can apply and/or be utilized by any of the example trading circles of FIGS. 4A to 4C and/or any other groups of users.

Returning the example depiction of the trading circle manager 300 shown in FIG. 3, the illustrated communication module 306 facilitates communication of trading data among the members of a trading circle, such as an example trading circle 450 shown in FIG. 4A. In one embodiment, the trading circle 450 may include each member or user of TTNET™ provided by Trading Technologies International, Inc. The example communication module 306 may be configured to organize, prioritize and communicate any type of trading data that the individual circle members have agreed to share with their fellow circle members. In some examples, each of the circle members has access to and/or receives the same information from the other circle members. In one embodiment, the example communication module 306 communicates circle data related to fellow circle members via a feed or other multicast communication that is configured to transmit data to each subscriber of the feed. In another embodiment, the communication module 306 may be configured to broadcast discrete messages and/or communication packets to directly to individual circle members. In yet another embodiment, the communication module 306 may communicate trading data in response to an information query received from one or more of the circle members. The communication module 306 generates the feed based on a feed information portion of the circle definition stored in the definition database 304. Further, the circle definition module 302 subscribes circle members to the feed(s) implemented by the example communication module 306. For example, the trading device 400a associated with the first member of the trading circle 450 may be configured to receive data via a feed implemented and provided by the communication module 306. The example communication module 306 can utilize additional or alternative communication techniques to convey trading data to the trading devices 400a to 400m comprising the example trading circle 450.

In the illustrated example, the order status monitor 308 of FIG. 3 detects orders and/or modifications to orders communicated by one or more of the trading devices 400a to 400m to the exchange 130. In operation, the order status monitor 308 detects one or more message transmitted to or from any of the trading devices 400a to 400m to the exchange 130 via the gateway 120 and Internet or other wide area network 470. The example order status monitor 308 determines a type of the detected message including, for example, whether the detected message pertains to an order, a modification request for an order, or any other type of message sent to the exchange the exchange. The example trading circle manager 300 can include additional or alternative analysis modules to identify additional or alternative interactions with the exchange by the circle members.

In some examples, the order status monitor 308 immediately triggers the communication module 306 to send data related to the detected message to the exchange analysis module 310 and/or the trading devices 400a to 400m comprising the trading circle 450. In the illustrated example, the exchange analysis module 310 determines the effects (if any) that the detected order and/or order modification will have on, for example, an order book of the corresponding exchange. For example, the detected message may correspond to a hedge order of a lean leg of a spread trade being placed at the exchange by the trading device 400a of the trading circle 450 in response to a quoting leg being filled. In such instances, the exchange analysis module 310 determines that the hedge order will reduce the quantity available at the corresponding price level by some amount (depending on the hedge order quantity and the current availability of the tradeable object at the price level of the hedge order). Other members of the trading circle 450 may be leaning on the tradeable object for a similar or the same price. If so, knowledge of the detected hedge order and the resulting reduction in quantity of the tradeable object is valuable information to those fellow circle members leaning on the tradeable object. Receipt of the data related to the detected hedge order by the circle members before non-circle members enables the circle members to react to the reduction in quantity before the non-circle members.

As another example, if the detected message is a buy order having a quantity of one-hundred (100) and a price of ninety (90) and the exchange indicates that a quantity of seventy-five (75) (i.e., less than the order quantity) of the tradeable object is available to buy at a price of ninety (90), the example exchange analysis module 310 determines that the tradeable object will not be available at ninety (90), or at least is not likely to be available to buy at ninety (90) for a period of time (for example, in the case that the quantity to buy of the tradeable object is added to the ninety (90) price level sometime after the initial buy order is detected). Again, knowledge of the expected changes at the exchange is value information to fellow circle members and the example trading circle manager 300 provides that knowledge to circle members before the knowledge is available to non-circle members.

As another example, if the detected message is a buy order having a quantity of one hundred (100) and a price of ninety (90) and the exchange indicates that a quantity of five hundred (500) (i.e., more than the order quantity) of the tradeable object is available to buy at a price ninety (90), the example exchange analysis module 310 determines that the quantity to buy of the tradeable object at ninety (90) is soon to be reduced by one hundred (100), or at least is likely to be reduced by one hundred (100), for example, in the case that quantity of the tradeable object is increased or decreased sometime after the initial buy order is detected. Again, knowledge of the expected changes at the exchange is value information to fellow circle members and the example trading circle manager 300 provides that knowledge to circle members before the knowledge is available to non-circle members.

The trading devices 400a to 400m and other trading devices of the illustrated examples are capable of generating and communicating a wide variety of orders, trading strategies, configurations, etc. Different types of messages detected by the order status monitor 308 and analyzed by the example exchange analysis module 310 can affect different types of counterpart orders and/or trading strategies in different ways. The example exchange analysis module 310 of FIG. 3 is configured to determine these effects and to prepare the effects for communication to the trading devices 400a to 400m of the trading circle 450. The members of the trading circle 450 can utilize the information provided by the example order status monitor 308 and/or the example exchange analysis module 310 in any suitable manner (for example, by configuring a respective one of the trading devices 400a to 400m to automatically adjust or re-plan a trading strategy in response to indication(s) of changes in price and/or quantity.)

The example trading circle manager 300 also includes a circle data manager 312. The example circle data manager 312 maintains comprehensive access to the position data (for example, working orders) of individual circle members comprising the trading circle 450. With that data, the example circle data manager 312 comprehensively monitors and tracks the data feeds containing a particular market aspect or aspects (for example, the tradeable objects, one or more market events, and other user defined and identifiable metrics set forth in the circle definition) to which the individual circle members comprising the trading circle 450 are interested and subscribed. In other words, the example circle data manager 312 of FIG. 3 tracks which of the individual circle members will be affected by different types of changes associated with one or more exchanges. The example circle data manager 312 works in conjunction with the exchange analysis module 310 to filter and otherwise limit communication of trading data to relevant or interested members of the trading circle 450. In particular, the example circle data manager 312 receives information from the exchange analysis module 310 regarding which aspects of the exchange are affected by a detected order/modification associated with a circle member. For example, the order status monitor 308 may detect a message sent by the trading device 400a operable within the trading circle 450 to the exchange 130 (see FIG. 1) that involves a tradable object 'X'. Further, the example exchange analysis module 310 determines that the detected message will or is likely to result in a reduction of quantity of 'X' at one or more price levels. Further, the example circle data manager 312 knows that the second trading device 400b has at least one order working at the exchange 130 that involves 'X' and that the third trading device 400c does not have any subscriptions, orders, or trading strategies that involve 'X'. In such instances, the example circle data manager 312 instructs the communication module 306 to convey information related to the detected message (e.g., data related to trading device 400a provided to trading device 400b) and/or the analysis performed by the exchange analysis module 310 to the second trading device 400b and to filter and forego communication of the information to the third trading device 400c (not shown).

The selective communication provided by the circle data manager 312 can be deactivated for some all of the members of the trading circle 450. Instead of filtering the information conveyed by the communication module 306, the example circle data manager 312 can be deactivated and the exchange analysis module 310 and/or the order status monitor 308 can instruct the communication module 306 to convey the data provided thereby to all circle members alike.

Figure 5:
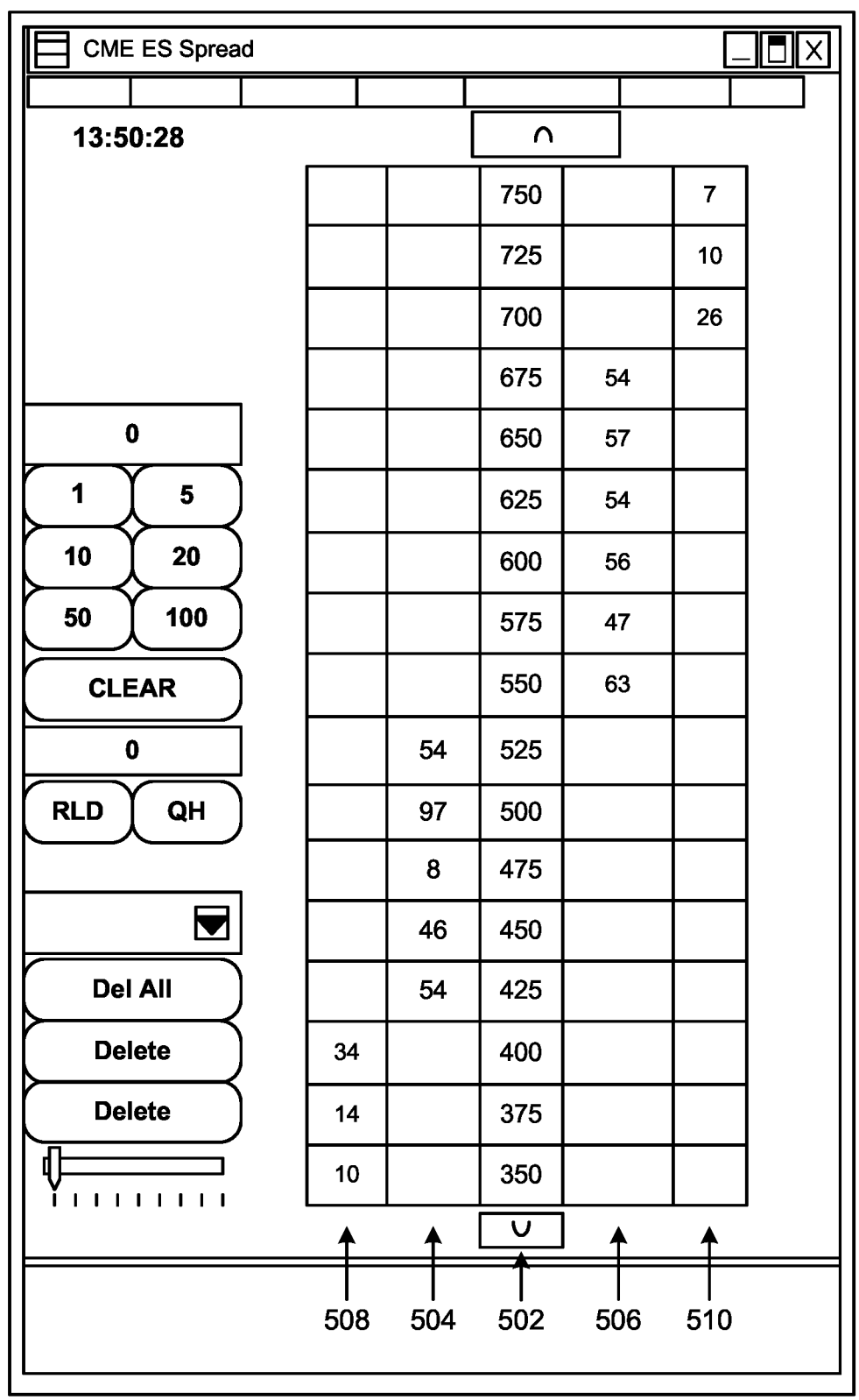
FIG. 5 illustrates a screenshot associated with the example price data expander of FIG. 3.

The example trading circle manager 300 of FIG. 3 may incorporate a price data monitor 314 to increase and/or estimate the amount of price information available to members of the trading circle 450. As described above, many exchanges limit the number of price levels for which quantity data is disseminated. FIG. 5 represents a screenshot of a trading window 500 that reflects price level and market depth information related to a tradeable object available at the exchange 130 of FIG. 1. The different price levels are shown in a value column 502, which includes increments or ticks of twenty-five (25) units representing, for example, $0.25. A bid quantity column 504 aligns adjacent to a first edge of the value column 502 and an ask quantity column 506 aligns adjacent to a second edge of the value column 502. As shown in FIG. 5, the exchange 130 indicates that a bid quantity of fifty-four (54) is present at the price level of five hundred twenty-five (525), that a bid quantity of ninety-seven (97) is present at the price level of five hundred (500), and so on. Further, the exchange 130 indicates that a sell quantity of sixty-one (61) is present at the price level of five hundred fifty (550), that a sell quantity of forty-seven (47) is present at the price level of five hundred seventy-five (575). However, the exchange does not disseminate data beyond the price level of four hundred-twenty-five (425) in the bid column 504 or beyond the price level of six hundred seventy-five (675) in the sell column 506. As a result, the exchange 130 provides a limited view of the market.

To provide a more complete view of the market, the example price data monitor 314 gathers information from the trading devices 400a to 400m of the trading circle 450 and uses the data to provide the circle members with information related to price levels for which the exchange 130 is not disseminating information. With reference to the example of FIG. 5, the price data monitor 314 provides information to members of the trading circle 450 regarding the price levels of four hundred (400), three hundred seventy-five (375), three hundred fifty (350) and beyond on the bid side. Further, the example price data monitor 314 provides information to members of the trading circle 450 regarding the price levels of seven hundred (700), seven hundred twenty-five (725), seven hundred fifty (750) and beyond on the ask side. In the example of FIG. 5, the price data monitor 314 displays the additional information provided thereby in first and second expansion columns 508 and 510. However, the example price data monitor 314 can communicate the additional price level information provided thereby via additional or alternative manners.

To gather information, the example price data monitor 314 accesses, for example, working orders of the trading devices 400a to 400m that have price levels outside the price level range currently being disseminated by the exchange 130. Thus, the example price data monitor 314 determines the price level range for which the exchange is currently dissemination information and then queries the trading devices 400a to 400m to determine if any of the trading device 400a to 400m have orders working outside the determined range. Alternatively, the example price data monitor 314 can collect data related to all of the working orders of the trading devices 400a to 400m and then determine which of the working orders fall outside the price level range for which the exchange is currently disseminating information.

To utilize the collected information, the example price data monitor 314 of FIG. 3 includes an aggregator 316 and an extrapolator 318. In the illustrated example of FIG. 3, the aggregator 316 and the extrapolator 318 provide separate, but related functions. The example aggregator 316 combines the data collected from the trading devices 400a to 400m related to the price levels for which the exchange 130 is not disseminating information to form a quantity for each those price levels. For example, if the first trading device 400a of the trading circle 450 has a working order involving the tradeable object of FIG. 5 having a bid quantity of twenty (20) at the four-hundred (400) price level, and the second trading device 400b has a working order involving the tradeable object of FIG. 5 having a bid quantity of fourteen (14) at the four-hundred (400) price level, the example aggregator 316 combines the bid quantities to indicate that the four-hundred (400) price level has at least a quantity of thirty-four (34). That information is reflected in the first expansion column 508 of FIG. 5. If additional ones of the trading devices 400a to 400m of the trading circle 450 had working orders at the four-hundred (400) price level, the aggregator 316 would add the corresponding quantity to the total shown in FIG. 5.

While the additional price level data provided by the example aggregator 316 is accurate, the aggregator 316 is limited by the proportion of the total working orders at the exchange 130 attributable to the trading circle 450. In some instances, the working orders of the trading circle 450 may represent a very small portion of the total orders working at the exchange 130. Thus, the value of thirty-four (34) described above may represent a small fraction of the actual quantity available at the four hundred (400) price level. Nevertheless, the aggregator 316 provides expanded price level information to the circle members that is valuable and unavailable to non-circle members.

To provide an expanded view of the market than the aggregator 316, the example extrapolator 318 of FIG. 3 generates estimates of available quantities at the different price levels for which the exchange 130 is not disseminating information. The example extrapolator 318 uses known price information regarding the trading circle 450 and the exchange 130 to generate estimations of unknown price information associated with the exchange 130. To do so, the example extrapolator 318 determines a portion of the total market for a tradeable object attributable to the trading circle 450, as a whole, within the price level ranges for which the exchange 130 is disseminating price information. In certain embodiments, the example extrapolator 318 may operate using a variety of extrapolation techniques such as: historical extrapolation, linear extrapolation, polynomial extrapolation, percentage extrapolation and any other know or later developed technique.

For example, with reference to FIG. 5, the extrapolator 318 determines that the working orders of the trading devices 400a to 400m of the trading circle 450 at price levels for which the exchange 130 is disseminating price information have quantities that sum to one hundred eighteen (118). At the same time, the example extrapolator 318 determines that the sum quantity disseminated by the exchange 130 is five hundred ninety (590), which is the sum of the bid and ask quantity columns 504 and 506. Accordingly, the example extrapolator 318 determines that the working orders of the trading devices 400a to 400m at the price levels for which the exchange is disseminating price information account for twenty percent (20%) of the market. The example extrapolator 318 uses the calculated percentage to generate one or more extrapolations or estimations for the price levels beyond those for which the exchange 130 is disseminating price information. In particular, the example extrapolator 318 determines a collective quantity of working orders of the trading devices 400a to 400m at price levels for which the exchange 130 is not disseminating information. The example extrapolator 318 applies the calculated percentage to the collective quantities to generate an estimated quantity at the exchange 130 for the each (or a subset of) the price levels outside of the disseminated price levels. To continue the above example, if the extrapolator 318 determines that the trading devices 400a to 400m collective have a quantity of fifteen (15) at a price level of 375, the example extrapolator 318 multiplies fifteen (15) by five (5) (per the 20% calculated above) to arrive at an estimated quantity of seventy-five (75) for the entire market at the price level of three-hundred seventy-five (375). The example extrapolator 318 performs similar calculations for any suitable number of the price levels falling outside the range of price levels for which the exchange 130 is disseminating price information. The example price data monitor 314 facilitates the communication of the extrapolations or estimations via, for example, one or more additional columns to the example window 500 of FIG. 5 and/or any other suitable user interface.

Thus, the example price data monitor 314 of FIG. 3 uses data related to members of the trading circle 450 to develop price information for price levels that the exchange 130 is not disseminating price information. Whether the aggregator 316 or the extrapolator 318 provides the expanded price information, the members of the trading circle 450 are privy to the information while non-circle members are not. Accordingly, the example price data monitor 314 provides the members of the trading circle 450 with a distinct advantage when interacting with the example 130 over non-circle members.

The example trading circle manager 300 of FIG. 3 also includes a theoretical fill module 320 that informs a first member of the trading circle 450 that one or more orders associated with the first member are likely to be filled based on trading data associated with one or more fellow members of the trading circle 450. The example theoretical fill module 320 tracks working orders of the circle members and the details of the working orders. For example, the theoretical fill module 320 tracks an identity of a tradeable object associated with the working orders, the bid/price of the working orders, and the quantities of the working orders. In other words, for a particular tracked working orders, the example theoretical fill module 320 tracks and stores (or has access to) information for the working order that indicates what market condition(s) need to exist for the working order to be filled.

Further, the example theoretical fill module 320 receives indications from the order status monitor 308 that one or more orders have been placed by someone in the trading circle 450. Alternatively, the example theoretical fill module 320 can detect the one or more orders being placed by a fellow circle member. The example theoretical fill module 320 analyzes the placed order(s) to determine whether the market condition(s) that need to exist for the tracked working order(s) to be filled are created by the order(s) placed by the fellow circle member(s). In other words, the example theoretical fill module 320 determines whether one member of the trading circle 450 has taken an action, such as placing an order, which will result in or is likely to result in a working order of another member of the trading circle 450 being filled or at least partially filled. The theoretical fill module 320 makes these determinations based on information that is shared among the circle members before or at the same time as the information being sent to the exchange 130. Thus, the example theoretical fill module 320 can inform a circle member that an order is going to be filled or is likely to be filled before that circle member is informed of the fill by the exchange 130.

For example, a first member of the trading circle 450 may have an order working at the exchange 130 to buy one-hundred (100) units of a tradeable object having the symbol GEH1 for $9968.00. While the order of the first circle member is working, a second member of the trading circle 450 may place an order to sell 'n' units of GEH1 at $9968.00, where 'n' is less than one-hundred (100). In the illustrated example, the theoretical fill detector 320 detects the order placed by the second circle member and determines that the order is likely to be filled based on the position of the first circle member. In particular, the order of the second circle member is likely to be filled because a quantity of more than 'n' exists at the price level of $9968.00. In response to this detection, the example theoretical fill module 320 causes the communication module 306 to send a theoretical fill indication to the second circle member along with the details of the calculations performed by the theoretical fill module 320 (for example, that a quantity of 'n' of the order is likely to be filled). Additionally, the communication module 306 can include a flag or other type of indicator that identifies the theoretical fill as a likely fill, as opposed to a certainty that the order will be filled. Additional or alternative information can be conveyed to the second circle member in connection with the operations of the theoretical fill module 320, such as details regarding the working order of the first circle member or the identity of the first circle member.

The example theoretical fill module 320 additionally tracks and analyzes the priority and/or queue positions of the circle members at the exchange 130 shown in FIG. 1. The exchange 130 may implement different types of priority or queue policies, such as a FIFO (first in first out) priority policy. The example theoretical fill module 320 may use the queue position information to calculate a likelihood that the working orders of the circle members will be filled based on activity of fellow circle members. Continuing the example scenario described above, if the theoretical fill module 320 determines that the first member of the trading circle 450 has a high priority or favorable queue position at the exchange 130, the theoretical fill module 320 can inform the first member of the trading circle 450 that the working order is about to be filled by a quantity of 'n' due the order placed by a second member of the trading circle 450. If the order of the second member of the trading circle 450 had been greater than 'n,' the example theoretical fill module 320 would inform the first member of the trading circle 450 that the entire working order of one hundred (100) units is about to be filled. Alternatively, if the first member of the trading circle 450 has a low priority or a less favorable queue position, the example theoretical fill module 320 tempers expectations of the first circle member having the working order filled. The message sent to the first member of the trading circle 450 via the communication module 306 can include likelihood data (for example, a percentage) calculated by the theoretical fill module 320. The calculations of the theoretical fill module 320 can additionally or alternatively consider quantities ahead of the first member of the trading circle 450 in the priority of the exchange 130 when determines how likely (for example, according to a percentage) the working order of the first member of the trading circle 450 is to be filled due to, for example, the placement of the order of by the second member of the trading circle 450 and/or other information from the exchange 130 or fellow members of the trading circle 450. Thus, the example theoretical fill module 320 provides indications and/or likelihoods of positions at the exchange 130 being filled based on (at least) activity of fellow members of the trading circle 450. The example theoretical fill module 320 provides the indications and/or likelihoods before the exchange 130 processes the information, thereby providing an advantage to the collective circle members.

FIG. 4B illustrates a distributed communication configuration such as a point-to-point or mesh configuration that may be implemented and managed by the example trading circle manager 300. In particular, instances and/or versions of the example trading circle manager 300 may be operable in each of the trading devices 400a to 400m, 402a to 402n, 404, 406, 408 and 412 to 418 shown in FIG. 4B and configured to share trade and circle data with other circle members. The individual instances of the trading circle manager 300 further allow the associated trading devices to communicate trade orders to the exchange 130 either directly or via the gateway 120. The trading circle manager 300 may be a distributed instance of the trading circle manager 300.

In the illustrated example shown in FIG. 4B, the trading devices 400a to 400m of trading organization 400 comprise the trading circle 450 and each include an example instance of the trading circle manager 300. In operation, the trading device 400a may be configured to communicate a trade order (as indicated by the reference arrow 460) to a network 440. In this example, the network 440 may be a public network such as the Internet and/or a private network such as a corporate wide-area network. The communicated trade order 460 may, in turn, be routed and delivered to the exchange 130 via the network 440. Communication of the trade order 460 to the exchange 130 may trigger the trading circle manager 300 to provide an update to one or more of the circle members. For example, if the trade order 460 is a buy order for 10 units of a tradable object at a price level of four hundred fifty (450) as shown in FIG. 5, then the order status monitor 308 of the trading circle manager 300 detects and captures the information associated with this order. The order status monitor 308 in cooperation with the communication module 306 and the exchange analysis module 310 determines the effects the trade order 460 may have upon the order book related to the tradable object maintained at the exchange 130. The circle data, including the estimated or projected effects of the trade order 460, generated by the exchange analysis module 310 can be communicated by the trading circle manager 300 and the communication module 306 the remaining trading devices 400b and 400m as indicated by the reference arrows 462a and 462b, respectively. In this way, individual members of the trading circle 450 are able to act upon the information contained within the trade order 460 (based on the effects or estimated effects contained in one or more of the received updates 462a and 462b) before a response 461 has been generated by the exchange 130 and delivered to the originating trading device 400a.

Members of the circle 450 may further share and communicate latency information based on, for example, the calculated round trip time associated with sending the trade order 460 and receiving a response 461 from the exchange 130. In particular, the time stamp from each communication sent and received by each member of the trade circle 450 can be tracked and stored. The stored timestamp values can, in turn, be utilized to calculate a time descriptive of the message latency experienced by users interacting with the exchange 130. As this information changes over time due to trading activity, the availability of network resources, etc., the cumulative latency information may be used to construct a latency profile for each exchange 130. The individual latency information as well as a latency profile may be utilized by a trader, a trading algorithm or other information consumer to direct markets communications to an exchange and/or market experiencing the lowest latency.

Members of the circle 450 may further share and communicate market condition information based on, for example, the fills, rejects and/or limits generated or experience in response to communication of the trade order 460 to the exchange 130. For example, if one or more circle members receives a rejection within a given period of time, this may indicate the presences of a throttle limit at the target exchange 130. By measuring and tracking rejections from a given exchange 130 as a function of time, the trading circle manage 300 may be able to estimate the throttle limit. Similarly, by measuring and tracking rejections from a given exchange 130 as a function of price level, the trading circle manage 300 may be able to estimate any active price range requirements in force at the exchange. The gathered market condition information may be utilized by a trader, a trading algorithm or other information consumer to direct markets communications to a preferred exchange and/or market.

In one or more exemplary embodiments, the circle data manager 312 of the trading circle manager 300 may determine that one or more of the remaining trading devices 400b to 400m as no open positions related to the tradable object associated with the trade order 460. In this instance, the trading device having no open positions in the tradable object may be identified by the circle data manager 312 as not needing the determine results and/or projected results. In this way, the trading device having no open positions can be spared receiving an unnecessary communication or update from the trading circle manager 300. Alternatively, a trading device having no open positions in the tradable object may elect to subscribe to the data feed containing the circle data in order to monitor, and possibly act, on the activity within the market.

FIG. 4B further illustrates that the individual trading device 404 of the trading circle 456 may be configured to communicate a trade order 463 to the network 440 and exchange 130 via the gateway 120. In this example, the trade order 463 generated by the trading device 404 is associated with the one or more tradable objects identified in the circle definition module 302 and the circle definition database 304 and utilized to establish the trading circle 456. Communication of the trade order 463 to the gateway 120 and exchange 130 triggers the simultaneous communication of circle data to the remaining circle members. In particular, the trading device 404 communicates a circle data update 464a to the trading organization 402 and a circle data update 464b to the individual trading device 406. Accordingly, the trading organization 402 including trading devices 402a to 402n and the individual trading device 406 may act upon the information contained within the updates 464a and 464b before an order acknowledgment or fill 465 is available to be acted upon by the trading device 404 or any other non-circle member. In this way, members of the trading circle 456 may have a time and/or speed advantage over non-circle members such as members of the social network 410 or the individual trading device 408.

FIG. 4C illustrates a centralized communication configuration that may be implemented and managed by the example trading circle manager 300. In particular, each of the trading devices 400a to 400m, 402a to 402n, 404, 406, 408 and 412 to 418 shown in FIG. 4C communicates with and provides updates to a standalone version of the trading circle manager 300. In this configuration, trade and circle data may be aggregated and/or compiled by the standalone trading circle manager 300 for to one or more of the trading circles and associated circle members. The standalone trading circle manager 300 may further be configured to aggregate and disseminate latency and/or fill information related to the individual circle members.

In the illustrated example shown in FIG. 4C, the trading devices 402a to 402n of the trading organization 402, individual trading devices 404 and 406 as well as the remaining trading devices 400a to 400m, 408 and 412 to 426 are configured to communicate with the centralized and standalone trading circle manager 300. In operation, the trading device 402a may be configured to communicate a trade order (as indicated by the reference arrow 480) to the centralized trading circle manager 300. In the present example, the standalone and centralized trading circle manager 300 is communicatively coupled to the exchange 130 via the and the network 440. Upon receipt of the communicated trade order 480, the trading circle manager 300 may, as described above, analyze the details contained within the order and communicate an update containing circle data to the remaining members of the trading circle 456. Thus, communication of the trade order 480 to the centralized trading circle manager 300 triggers the communication of trade data updates 482a to 482c and the associated circle data to the trading devices 402n, 404 and 406, respectively. The circle data contained in the trade data updates 482a to 482c allows the trading devices 402n, 404 and 406 within the trading circle 456 to act upon the information without waiting for a confirmation or update from the exchange 130. Conversely, the original trade order 480 continues on to the exchange 130 and the network 440.

The exchange 130, as illustrated in FIG. 4C, generates a response, fill or other communication 484 in response to receipt of the trade order 480. The communication 484 generated by the exchange 130 is, in turn, provided to the gateway 120 for transmission to the one or more trading devices subscribing to the feed. In particular, the communication 484 may be provided to one or more trading devices such as the trading organization 400 via the subscriber feed 484b and the social network 410 via the subscriber feed 484c. Similarly, the acknowledgment and/or fill contained within the communication 484 may be provided to the trading device 402a via the subscriber feed 484a. In this way, members of the trading circle 456 may, in cooperation with the centralized trading circle manager 300, share and act upon the information contained within the trade order 480 before the communication 484 is generated much less received by the non-circle members.

Figure 6:
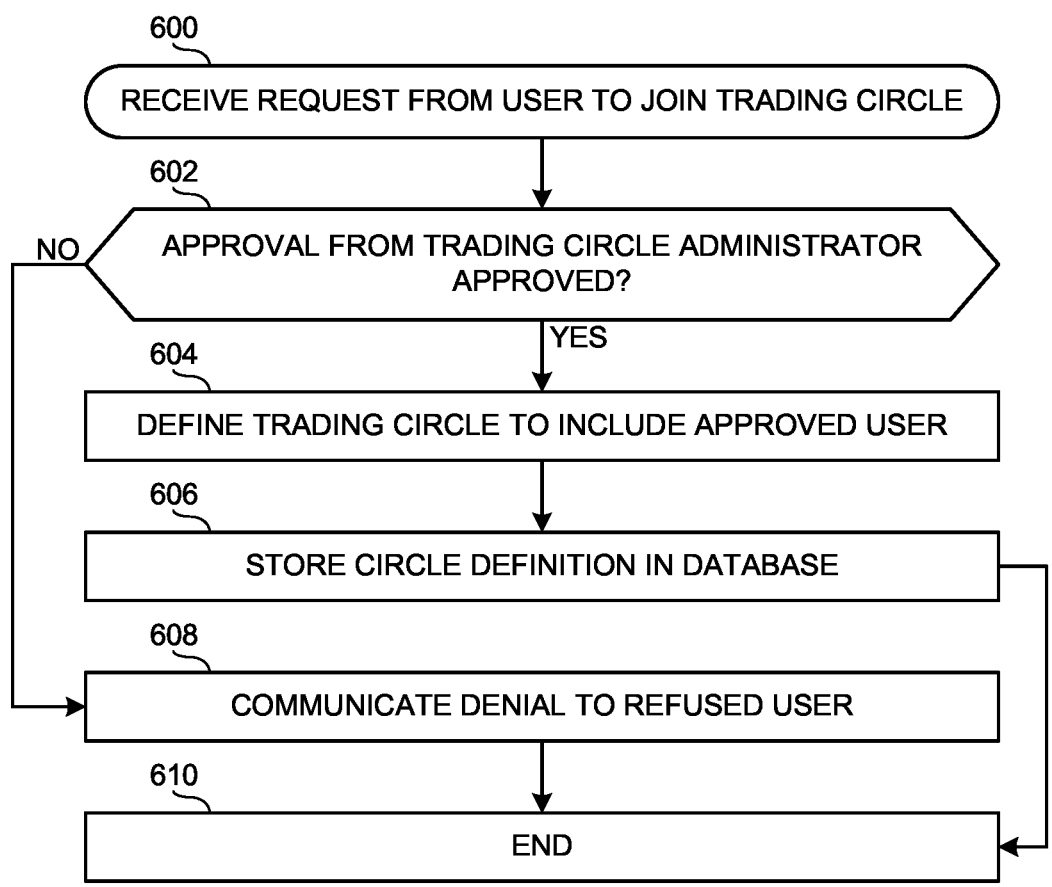
FIG. 6 is a first flow diagram illustrative of machine readable instructions that may be executed to implement the example circle definer of FIG. 3.

FIG. 6 is a block diagram illustrating an example method of implementing the example circle definition module 302 of FIG. 3. As described above, the example circle definition module 302 receives requests from user to initiate a trading circle, as well as requests to join an existing trading circle. In the example of FIG. 6, the circle definition module 302 receives a request from a first user of the trading circle manager 300 to join an existing trading circle (block 600). In response to the request, the example circle definition module 302 sends a message to a person or device associated with the corresponding trading circle, such as a trading circle administrator. The message includes information related to the requesting user, such as an identity and/or credentials of the requesting user. If the example circle definition module 302 receives approval of the requesting user from the administrator, the example circle definition module 302 accepts the requesting user into the trading circle (block 604). In the illustrated example, accepting the user into the trading circle includes adding an identifier corresponding to the requesting user to a definition of the trading circle. The example circle definition module 302 stores the updated circle definition to the corresponding entries of the circle definition database 304 (block 606). Referring back to the approval process (block 602), if the circle definition module 302 does not receive approval of the requesting user from the administrator or does not receive any response from the administrator (for example, within a certain time period), the example circle definition module 302 communicates a denial to the requesting user (block 608). The example of FIG. 6 then ends (block 610).

Figure 7:
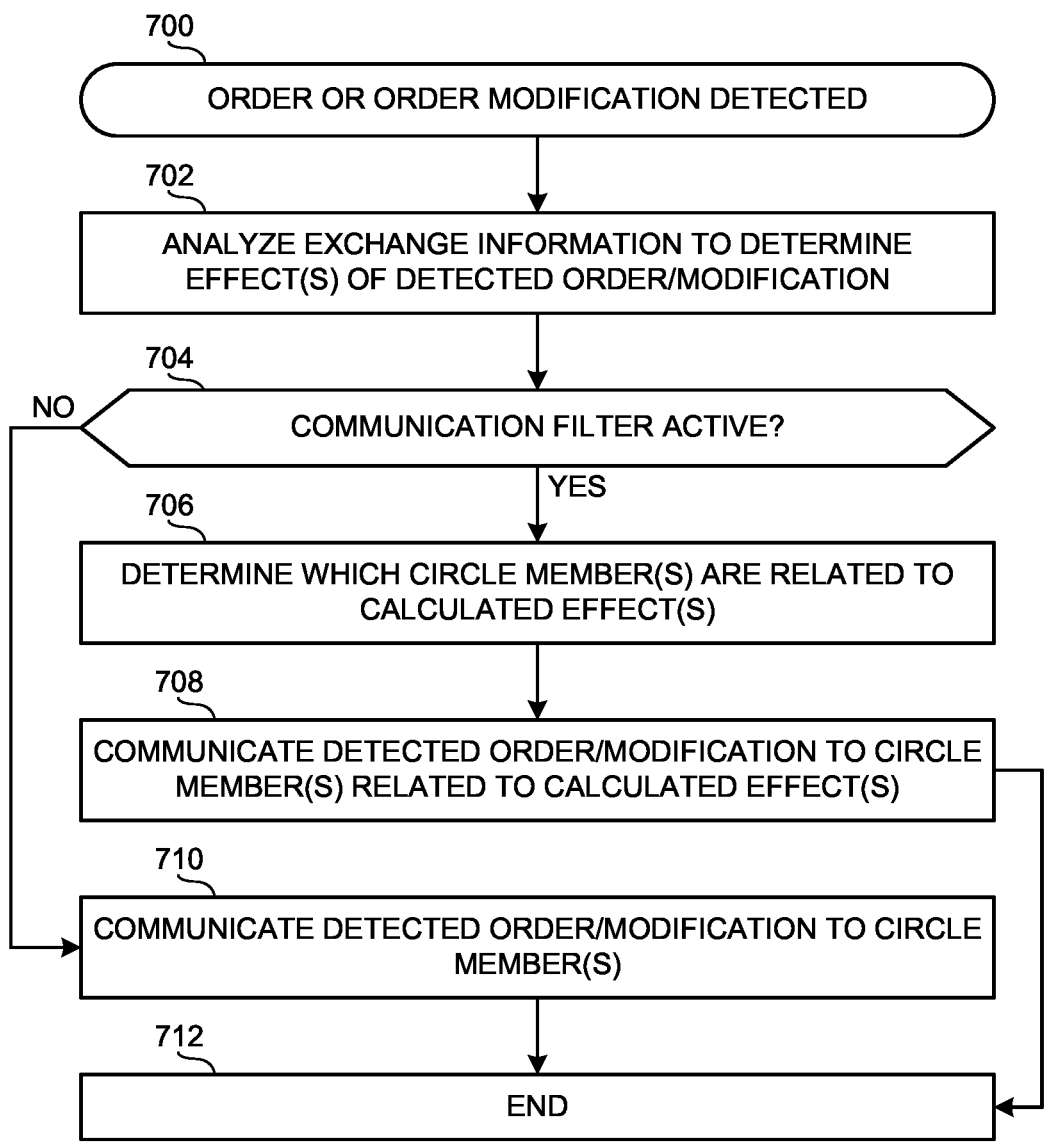
FIG. 7 is a second flow diagram illustrative of machine readable instructions that may be executed to implement the example trading circle manager of FIG. 3.

FIG. 7 is another block diagram illustrating an example method of implementing the example trading circle manager 300 of FIG. 3. The example of FIG. 7 begins with the order status monitor 308 detecting an order or a modification of an order by one of a plurality of circle members of a trading circle defined in the database 304 (block 700). For example, the order status monitor 308 detects an order sent to the exchange 130 from the trading device 400a (see FIG. 4A) associated with a first member of the trading circle 450. The example exchange analysis module 310 analyzes the detected order/modification and information associated with the current status of the exchange 130 to determine the effects of the detected order/modification (block 702). For example, the exchange analysis module 310 determines whether and how the detected order/modification will affect the order book of the exchange 130.

If the example circle data manager 308 is active (block 704), the circle data manager 308 identifies which circle members would be interested in the detected order/modification or data related to effect(s) of the detected order/modification on the exchange 130 (block 706). For example, when the detected order/modification involves first and second tradeable objects (for example, that respectively make up a quoting leg and a lean leg of a spread trade), the example circle data manager 308 identifies any of the circle members having a working order involving either one (or both) of the first and second tradeable objects as circle member(s) that would be interested in receiving related information. Thus, when active, the example circle data manager 308 prevents members of the trading circle from being inundated with information that is not necessarily relevant to the corresponding members. In such instances, the example communication module 306 conveys information to the circle members identified as being interested in the information, which includes the detected order/modification, data related to the detected order/modification (for example, an identity of the corresponding circle member), and the effect(s) of the detected order/modification on the exchange 130 and/or any other market entity, etc. (block 708). Further, the information conveyed by the communication module 306 can include any theoretical fills identified by the theoretical fill detector 320.

In the illustrated example, if the example circle data manager 308 is not active (block 704), the example communication module 306 conveys the information to each of the circle members (block 710). The example of FIG. 7 then ends (block 712).

Figure 8:
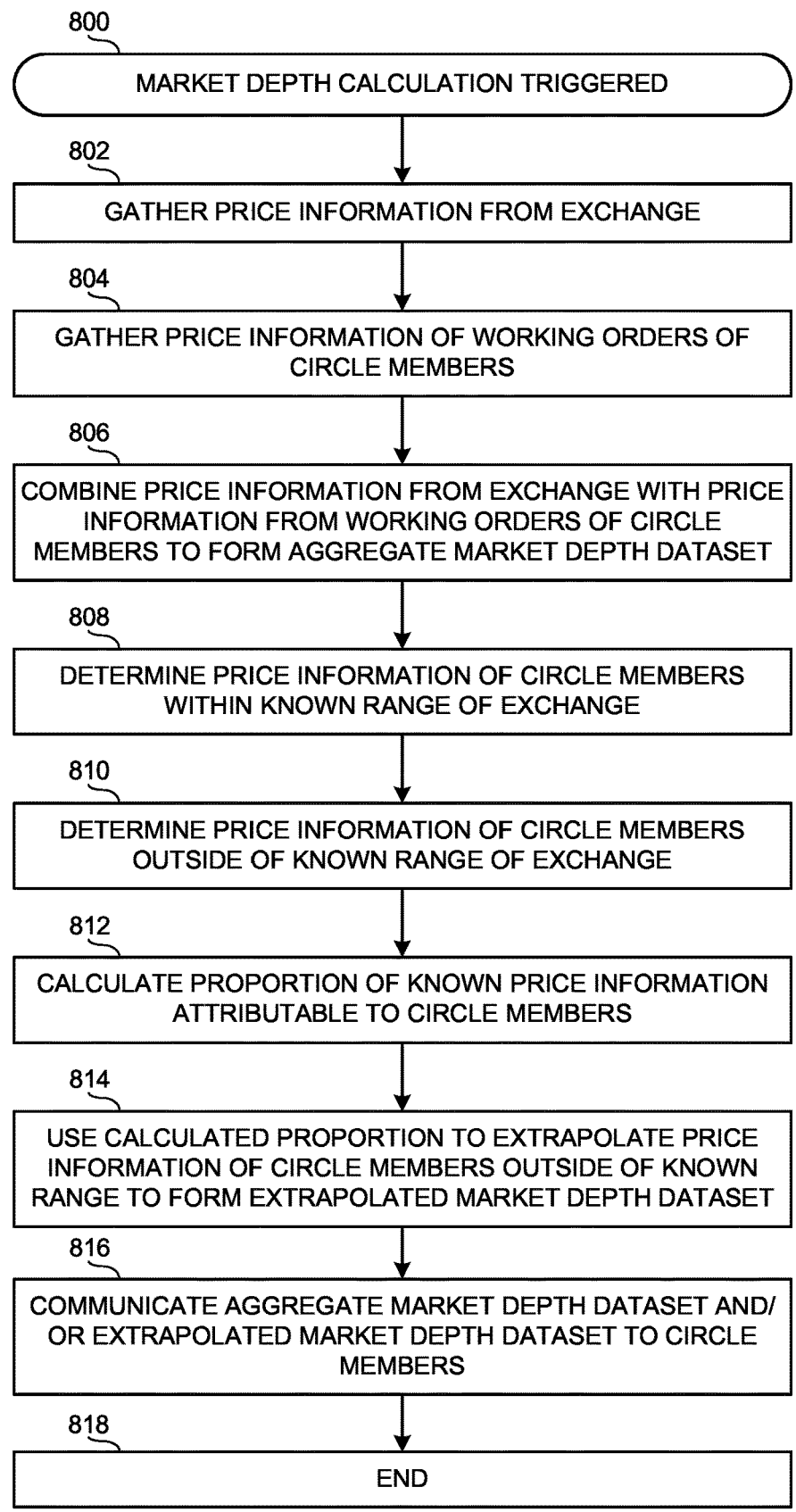
FIG. 8 is a third flow diagram illustrative of machine readable instructions that may be executed to implement the example price data expander of FIG. 3.

FIG. 8 is another block diagram illustrating an example method of implementing the example price data monitor 314 of FIG. 3. The example of FIG. 8 begins with the price data monitor 314 being triggered in response to, for example, a scheduled event or other type(s) of instructions (block 800). The example price data monitor 314 gathers price information from the exchange 130 (block 802). As described above, the exchange 130 only provides price information for a limited amount of price levels. The example price data monitor 314 also gathers price information related to working orders of the members of the trading circle 450 (block 804). In the illustrated example, the gathering involves querying the trading devices 400a to 400m of the trading circle 450 to identify working orders of the members of the trading circle 450 outside of the price level range disseminated by the exchange 130. The example aggregator 316 of the price data monitor 314 combines the data collected from the trading devices 400a to 400m with the information gathered from the exchange 130 (block 806). The combined information forms an aggregate view of the market depth for the members of the trading circle 450. In the illustrated example, the aggregate view of the market provided by the example aggregator 316 is presented to the members of the trading circle via, for example, the window 500 of FIG. 5.

As described above, the example price data monitor 314 also includes the extrapolator 318 to provide a fuller (but perhaps less accurate) view of the market than the aggregator 316. In the example of FIG. 8, the extrapolator 318 determines price information related to the circle members within the range of price levels for which quantity data is disseminated by the exchange 130 (block 808). Further, the example extrapolator 318 determines price information related to the members of the trading circle 450 outside the range of price levels for which quantity data is disseminated by the exchange 130 (block 810). The example extrapolator 318 uses the price information related to the members of the trading circle 450 within the disseminated range of price levels to calculate a portion of the market represented by the trading circle 450 (block 812). For example, the extrapolator 318 determines a percentage of the quantity at the exchange 130 that is attributable to the trading circle 450, collectively. The example extrapolator 318 uses the calculated portion or percentage to extrapolate price information gathered from the trading circle 450 for price levels outside the disseminated range (block 814). That is, the example extrapolator 318 applies the percentage of the quantity of the market in the disseminated price levels represented by the trading circle 450 to the price information collected from the trading circle 450 at the price levels outside of the disseminated range. As a result, the example extrapolator 318 generates an expanded view of the market for the members of the trading circle 450. The data generated by the aggregator 316 and/or the extrapolator 318 is communicated to the circle members (block 816). The example of FIG. 8 then ends (block 818).

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

The invention claimed is:

1. A non-transitory computer readable medium having stored therein instructions executable by a processor, including instructions executable to:

track by a trading circle manager members of a trading circle, wherein the trading circle manager facilitates communication for the trading circle, wherein the trading circle includes a plurality of members, wherein the tracking includes associating a first subset of the plurality of members with a first tradeable object;

receive by the trading circle manager first data from a first trading device for an order of the first trading device, wherein the order of the first trading device is a new order, wherein the first trading device is a member of the trading circle, wherein the tracked first subset of the plurality of members includes the first trading device;

determine by the trading circle manager, in response to receiving the first data from the first trading device for the order of the first trading device and before an electronic exchange sends an indication of the order of the first trading device, that the order of the first trading device is for the first tradeable object, wherein the order of the first trading device is associated with a first quantity at a first price;

aggregate by the trading circle manager, in response to determining that the order of the first trading device is for the first tradeable object and before the electronic exchange sends an indication of the order of the first trading device, the first data for the order of the first trading device and data for orders of other members in the tracked first subset of members of the trading circle to generate aggregated market depth data for the first tradeable object, wherein the aggregated market depth data represents quantities available for the first tradeable object at corresponding price levels, wherein the aggregated market depth data does not include market depth data from an electronic exchange;

generate by the trading circle manager, in response to aggregating the market depth data for the first tradeable object and before the electronic exchange sends an indication of the order of the first trading device, a message including the aggregated market depth data; and send by the trading circle manager the generated message including the aggregated market depth data to the tracked first subset of the plurality of members of the trading circle associated with the first tradeable object, wherein the market depth data is provided to the trading circle after the order of the first trading device is sent to the electronic exchange, wherein the market depth data is provided to the trading circle before the electronic exchange sends an indication of the order of the first trading device, wherein a second trading device in the tracked first subset of members of the trading circle sends a second order to the electronic exchange based on the aggregated market depth data before the electronic exchange sends an indication of the order of the first trading device.

2. The non-transitory computer readable medium of claim 1, wherein the plurality of members includes a third trading device.

3. The non-transitory computer readable medium of claim 1, further including instructions executable to:

establish by the trading circle manager the trading circle for the plurality of members.

4. The non-transitory computer readable medium of claim 1, further including instructions executable to:

receive by the trading circle manager a request to join the trading circle by the first trading device.

5. The non-transitory computer readable medium of claim 1, further including instructions executable to:

receive by the trading circle manager a request to join the trading circle by the second trading device.

6. The non-transitory computer readable medium of claim 1, wherein the first trading device and the second trading device are part of a same trading organization.

7. The non-transitory computer readable medium of claim 1, wherein the first trading device and the second trading device are part of a different trading organization.

8. The non-transitory computer readable medium of claim 1, wherein the trading circle manager includes a circle definition module.

9. The non-transitory computer readable medium of claim 1, wherein the trading circle manager includes a communication module.

10. The non-transitory computer readable medium of claim 1, wherein the trading circle manager includes a circle data manager.

11. The non-transitory computer readable medium of claim 1, wherein the trading circle manager includes a price data monitor.

12. The non-transitory computer readable medium of claim 1, wherein the trading circle manager is distributed.

13. The non-transitory computer readable medium of claim 1, wherein the trading circle manager is centralized.

14. The non-transitory computer readable medium of claim 1, wherein the first data from the first trading device is received in response to a query by the trading circle manager.

15. The non-transitory computer readable medium of claim 1, wherein the first data from the first trading device is received in response to detecting the first trading device sending the order to the electronic exchange.

16. The non-transitory computer readable medium of claim 1, further including instructions executable to:

determine by the trading circle manager, in response to receiving the first data from the first trading device for the order of the first trading device and before the electronic exchange sends an indication of the order of the first trading device, an expected effect, wherein the expected effect represents a change in a quantity available for the first tradeable object at the first price associated with the order of the first trading device based on the first quantity associated with the order of the first trading device.

* * * * *